US010042215B2

(12) United States Patent
Lee et al.

(10) Patent No.: US 10,042,215 B2
(45) Date of Patent: Aug. 7, 2018

(54) LIQUID CRYSTAL DISPLAY

(71) Applicant: SAMSUNG DISPLAY CO., LTD., Yongin-si, Gyeonggi-do (KR)

(72) Inventors: Se Hyun Lee, Seoul (KR); Ik Han Oh, Cheonan-si (KR); Wan Namgung, Asan-si, (KR); Ho Jun Lee, Asan-si (KR); Youn Hak Jeong, Cheonan-si (KR); Ki Pyo Hong, Hwaseong-si (KR)

(73) Assignee: SAMSUNG DISPLAY CO. LTD., Gyeonggi-Do (KR)

(*) Notice: Subject to any disclaimer, the term of this patent is extended or adjusted under 35 U.S.C. 154(b) by 119 days.

(21) Appl. No.: 15/165,013

(22) Filed: May 26, 2016

(65) Prior Publication Data
US 2016/0377940 A1    Dec. 29, 2016

(30) Foreign Application Priority Data

Jun. 24, 2015    (KR) ........................ 10-2015-0089968

(51) Int. Cl.
*G02F 1/1337*    (2006.01)
*G02F 1/1343*    (2006.01)
*G02F 1/1362*    (2006.01)

(52) U.S. Cl.
CPC .. *G02F 1/134309* (2013.01); *G02F 1/133707* (2013.01); *G02F 1/136209* (2013.01); *G02F 2001/134345* (2013.01); *G02F 2001/136222* (2013.01)

(58) Field of Classification Search
CPC ............................................... G02F 1/133707
See application file for complete search history.

(56) References Cited

U.S. PATENT DOCUMENTS

| 2011/0216261 A1* | 9/2011 | Han | G02F 1/134336 349/42 |
| 2013/0194536 A1* | 8/2013 | Tae, II | G02F 1/133707 349/143 |
| 2013/0285891 A1* | 10/2013 | Zhang | G02F 1/133707 345/90 |

(Continued)

FOREIGN PATENT DOCUMENTS

| JP | 2014182367 A | 9/2014 |
| KR | 1020130101325 A | 9/2013 |
| KR | 1020130104521 A | 9/2013 |

(Continued)

*Primary Examiner* — Kendrick Hsu
(74) *Attorney, Agent, or Firm* — Cantor Colburn LLP

(57) ABSTRACT

A liquid crystal display includes a first panel including a first substrate, a first electrode which is disposed on the first substrate and which includes a stem unit including a horizontal stem and a vertical stem dividing a pixel into domains, a branch unit including branch electrodes and extending from at least one stem of the stem unit in one direction, and an external bundling electrode unit connected to an end of at least one of the branch electrodes and disposed along an edge of the pixel, a first slit pattern which is defined in the branch unit, a second slit pattern which contacts the vertical stem and is disposed parallel to the horizontal stem, a third slit pattern which contacts the horizontal stem and is disposed parallel to the vertical stem, and a protrusion unit which is disposed on an outer circumference of the external bundling electrode unit.

20 Claims, 17 Drawing Sheets

(56) References Cited

U.S. PATENT DOCUMENTS

2014/0267994 A1     9/2014  Ryu et al.
2016/0018705 A1*    1/2016  Cheng ............... G02F 1/134309
                                                              349/123

FOREIGN PATENT DOCUMENTS

KR     1020160084555      7/2016
KR     1020170001812      1/2017

* cited by examiner (a)        (b)        (c)

(a)　　　　　　　　(b)　　　　　　　　(c)

LIQUID CRYSTAL DISPLAY

This application claims priority to Korean Patent Application No. 10-2015-0089968 filed on Jun. 24, 2015, and all the benefits accruing therefrom under 35 U.S.C. § 119, the content of which in its entirety is herein incorporated by reference.

BACKGROUND

1. Field

The exemplary embodiments relate to a liquid crystal display ("LCD").

2. Description of the Related Art

A liquid crystal display ("LCD"), which is one of the most widely used flat panel displays, generally includes two display panels, which is provided with field generating electrodes such as pixel electrode and common electrode, and a liquid crystal layer disposed therebetween. The LCD is configured such that a voltage is applied to the field generating electrodes to generate an electric field in the liquid crystal layer, and, through the electrical field, the orientation of liquid crystal molecules is determined and the polarization of incident light is controlled, thereby displaying an image.

Among LCDs, a vertically-aligned mode LCD can form a plurality of domains, in which orientation directions are different, in one pixel in order to realize a wide viewing angle.

As an example of means for forming a plurality of domains, there is a method of forming incisions such as slits in each of the field generating electrodes. In this method, liquid crystals are rearranged by the fringe field generated between the edge of the incision and the field generating electrode facing this edge, thereby forming a plurality of domains.

In the vertically-aligned mode LCD, it is important to secure a wide viewing angle. For this purpose, a method of forming incisions, such as fine slits, in the field generating electrode or a method of forming protrusions on the field generating electrode is used. Since incisions or protrusions determine the tilt direction of liquid crystal molecules, the incisions or protrusions determine are appropriately disposed to disperse the tilt direction of liquid crystal molecules in various directions, thereby widening a viewing angle.

SUMMARY

In the vertically-aligned mode liquid crystal display ("LCD"), lateral visibility may deteriorate compared to front visibility.

Exemplary embodiments of the invention provide an LCD with improved response speed and transmittance.

However, exemplary embodiments of the invention are not restricted to those set forth herein. The above and other exemplary embodiments of the invention will become more apparent to one of ordinary skill in the art to which the invention pertains by referencing the detailed description of the invention set forth below.

According to an exemplary embodiment of the invention, an LCD includes a first panel including a first substrate, a first electrode which is disposed on the first substrate and which includes a stem unit including a horizontal stem and a vertical stem dividing a pixel into a plurality of domains, a branch unit including a plurality of branch electrodes and extending from at least one stem of the stem unit in one direction, and an external bundling electrode unit connected to an end of at least one of the branch electrodes and disposed along an edge of the pixel, a first slit pattern which is disposed on the branch unit to allow the branch electrodes to be spaced apart from each other, a second slit pattern which contacts the vertical stem and is disposed in a direction parallel to the horizontal stem, a third slit pattern which contacts the horizontal stem and is disposed in a direction parallel to the vertical stem, and a protrusion unit which is disposed on an outer circumference of the external bundling electrode unit and protrudes in a direction perpendicular to the first substrate, a second panel including a second substrate, and a second electrode disposed on the second substrate and facing the first electrode, and a liquid crystal layer disposed between the first panel and the second panel.

In an exemplary embodiment, the second slit pattern may be connected to an end of a lateral side of the first slit pattern, and the third slit pattern may be connected to ends of upper and lower sides of the first slit pattern.

In an exemplary embodiment, the second and third slit patterns may be disposed to allow the external bundling electrode unit to be spaced apart from the ends of the branch electrodes.

In an exemplary embodiment, the branch electrodes and slit patterns, which may be disposed in a domain and another domain adjacent to the domain, are alternately arranged.

In an exemplary embodiment, the pitches of the branch electrodes and the first slit pattern may be in a range of about 4 micrometers ($\mu$m) to about 8 $\mu$m, for example.

In an exemplary embodiment, the LCD may further include a first polarizing plate having a polarization axis aligned on the first panel in one direction, and a second polarizing plate having a polarization axis aligned on the second panel in a direction perpendicular to the one direction, wherein the extending direction of the branch unit is in a range of about 30 degrees (°) to about 60° with respect to the polarization axis of each of the first and second polarizing plates.

In an exemplary embodiment, the first electrode may be configured such that the external bundling electrode unit which contacts the protrusion unit and may be disposed in a direction parallel to the protrusion unit, the stem unit which is connected to the external bundling electrode unit and includes the horizontal and vertical stems dividing the pixel into the plurality of domains, and the branch unit which extends to the horizontal and vertical stems to be connected to the external bundling electrode unit are integrally provided.

In an exemplary embodiment, the widths of the horizontal and vertical stems may be in a range of about 2 $\mu$m to about 5 $\mu$m.

In an exemplary embodiment, the height of the protrusion unit may be in a range of about 0.5 $\mu$m to about 2 $\mu$m.

In an exemplary embodiment, the width of the external bundling electrode unit may be in a range of about 2 $\mu$m to about 4 $\mu$m.

In an exemplary embodiment, the widths of the second and third slit patterns and the external bundling electrode unit are may be a range of about 4 $\mu$m to about 8 $\mu$m.

In an exemplary embodiment, the widths of the protrusion unit and the external bundling electrode unit may be in a range of about 7 $\mu$m to about 9 $\mu$m.

In an exemplary embodiment, the width of the protrusion unit may be in a range of about 3 $\mu$m to about 5 $\mu$m.

In an exemplary embodiment, the first electrode disposed in the pixel may include a first region in which the branch unit is disposed adjacent to the stem unit, and a second region in which one or more of the external bundling electrodes and the protrusions, which are connected to the end of any one of the branch electrodes, are spaced apart from the stem unit, wherein the external bundling electrode unit and the protrusion unit disposed in the second region provide a vector for rotating the liquid crystal molecules in the second region in a direction similar to the average liquid crystal azimuth of the liquid crystal molecules in the first region.

In an exemplary embodiment, the extending direction of the branch electrodes may be identical with the average liquid crystal azimuth of the liquid crystal molecules.

In an exemplary embodiment, the first electrode may further include a plurality of sub-electrodes disposed in one pixel, and a connection electrode connecting the sub-electrodes adjacent to each other.

In an exemplary embodiment, the connection electrodes may be disposed in an intermediate unit spacing the adjacent sub-electrodes apart from each other.

In an exemplary embodiment, the protrusion unit may be disposed in the intermediate unit.

In an exemplary embodiment, the protrusions may be disposed at the ends of the horizontal and vertical stems and the corners of the pixel.

In an exemplary embodiment, the protrusion unit may be disposed at the edge of the pixel excluding the corner of the pixel.

Other features and exemplary embodiments will be apparent from the following detailed description, the drawings, and the claims.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
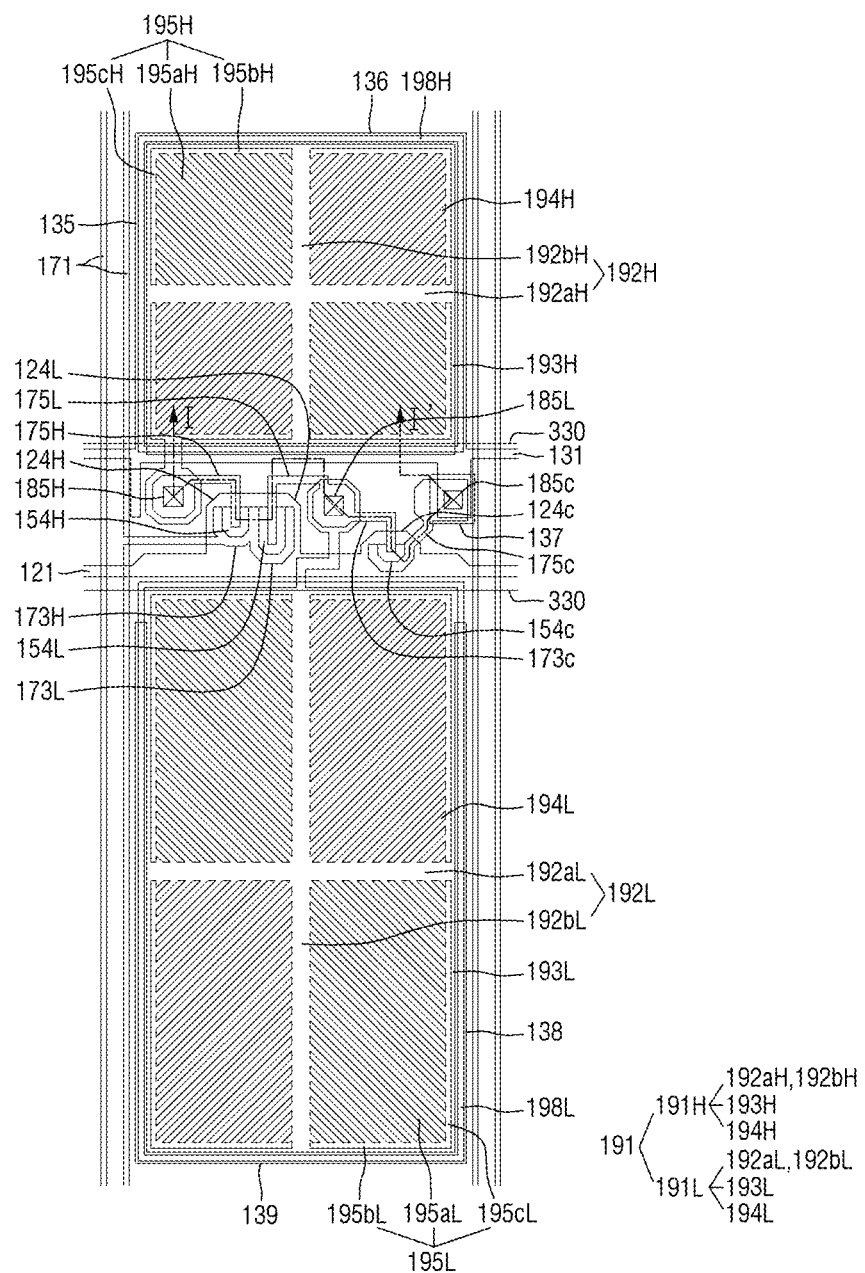
FIG. 1 is a plan view of a liquid crystal display ("LCD") according to an exemplary embodiment of the invention.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention is a part. Terms, such as those defined in commonly used dictionaries, should be interpreted as having a meaning that is consistent with their meaning in the context of the relevant art and will not be interpreted in an idealized or overly formal sense, unless expressly so defined herein.

Exemplary embodiments of the invention will now be explained with reference to the drawings.

Figure 2:
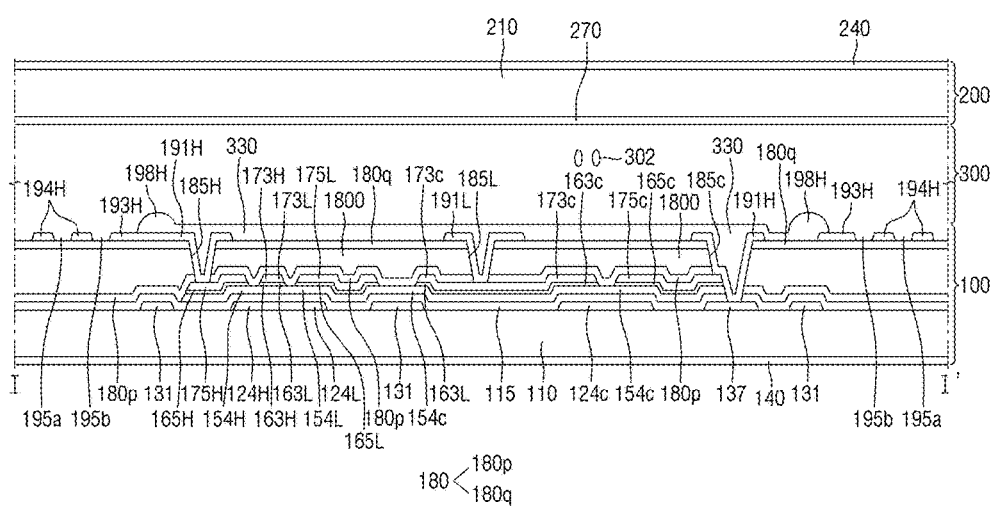
FIG. 2 is a cross-sectional view taken along line I-I' of the LCD FIG. 1.
Figure 3:
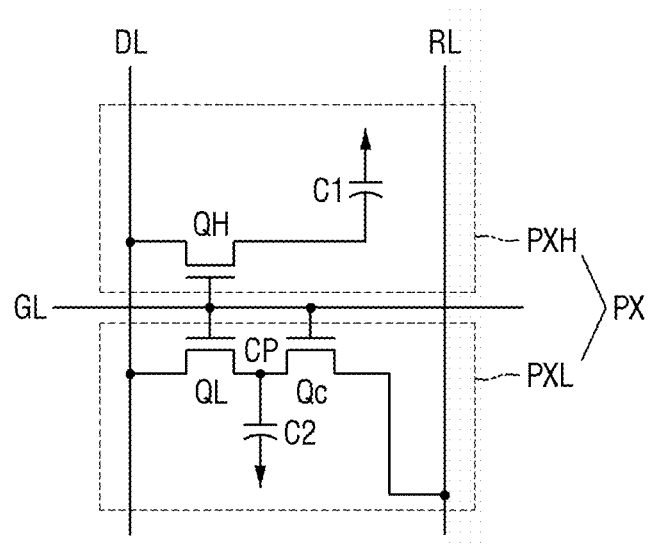
FIG. 3 is an equivalent circuit diagram for an exemplary embodiment of one pixel of the LCD according to the invention.
Figure 4:
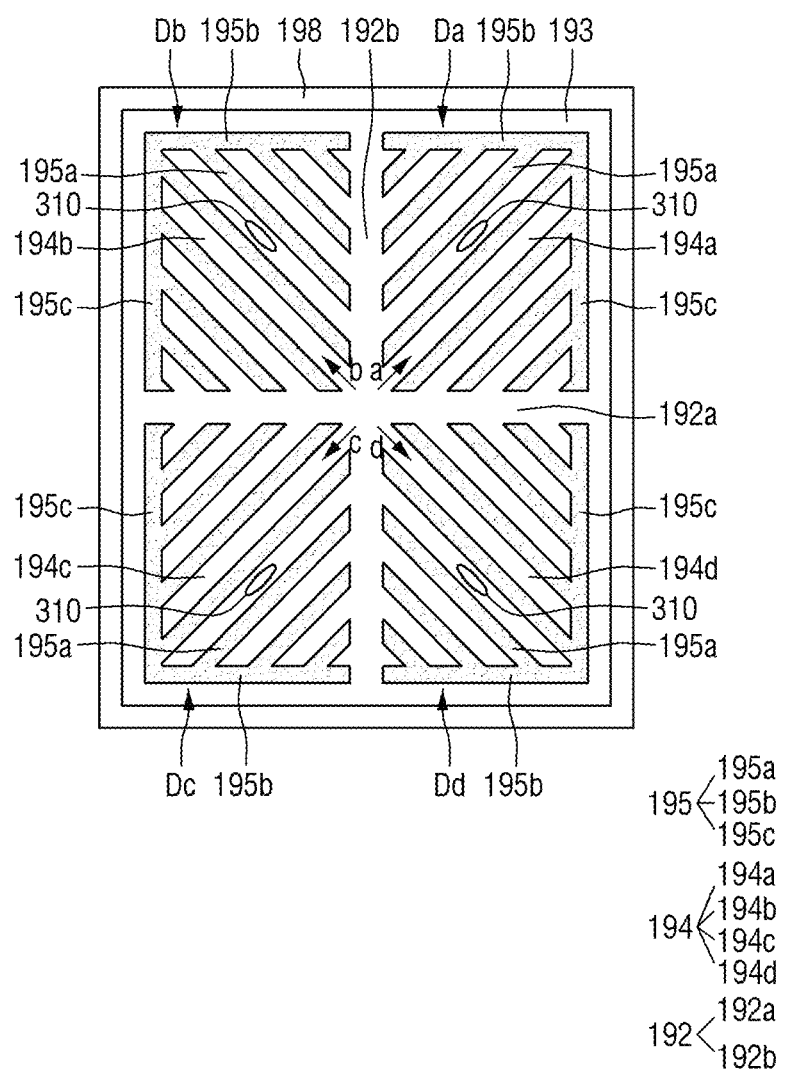
FIG. 4 is an enlarged plan view of an exemplary embodiment of one pixel according to the invention.

FIG. 1 is a plan view of an LCD according to an exemplary embodiment of the invention, and FIG. 2 is a cross-sectional view taken along line I-I' of the LCD FIG. 1. FIG. 3 is an equivalent circuit diagram for one pixel of the LCD according to an exemplary embodiment of the invention, and FIG. 4 is an enlarged plan view of one pixel according to an exemplary embodiment of the invention.

In FIGS. 1 and 3, for the convenience of explanation, one pixel PX, and a gate line GL, a data line DL, and a partial reference voltage line RL related therewith are shown. However, a plurality of pixels may be arranged in a matrix of rows and columns, and may also be arranged around the intersections of a plurality of gate lines 121 extending in the row direction and a plurality of data lines 171 extending in the column direction.

Referring to FIGS. 1 and 2, an LCD includes a first panel 100 and a second panel 200, which face each other, and a liquid crystal layer 300 disposed between the first panel 100 and the second panel 200.

The first panel 100 may include a first substrate 110, a first electrode 191 and a first alignment film (not shown), which are sequentially disposed on one side of the first substrate 110, and a first polarizing plate 140 which is disposed on the other side of the first substrate 110. Here, the first electrode 191 provided in the first panel 100, for example, may be a pixel electrode.

The second panel 200 may include a second substrate 210, a second electrode 270 and a second alignment film, which are sequentially disposed on one side of the second substrate 210, and a second polarizing plate 240 which is disposed on the other side of the second substrate 210. Here, the second electrode 270 provided in the second panel 200, for example, may be a common electrode.

The first panel 100 or the second panel 200 may further include switching elements QH, QL, and Qc (refer to FIG. 3), a color filter 1800, and a light blocking member 330. In another exemplary embodiment, one of the first polarizing plate 140 and second polarizing plate 240 may be omitted. In other exemplary embodiment, any one or both of the first alignment film and the second alignment film may be omitted.

The liquid crystal layer 300 may include a liquid crystal having a negative dielectric anisotropy or a liquid crystal having a positive dielectric anisotropy. In the following embodiments, there is exemplified a case that the liquid crystal layer 300 includes a liquid crystal having a negative dielectric anisotropy, for example. When an electric field does not exist between the first and second electrodes 191 and 270, the liquid crystal molecules 302 in the liquid crystal layer 300 may be arranged such that the major axis thereof is disposed in a direction perpendicular to the surface of the first and second alignment films. Further, the liquid crystal molecules 302 may be arranged such that the major axis thereof has a pretilt angle to the thickness direction of the liquid crystal layer 300.

Hereinafter, the first panel 100 and the second panel 200 will be described in detail, respectively.

First, the first panel 100 may include a first substrate 110, a first switching element QH, a second switching element QL, and a third switching element Qc, and a gate line 121, a partial reference line 131, a data line, and a pixel electrode 191, which are electrically connected with these switching elements QH, QL, and Qc. The pixel electrode 191 includes a first sub-pixel electrode 191H and a second sub-pixel electrode 191L. The first subpixel electrode 191H may include a horizontal stem 192aH, a vertical stem 192bH, an external bundling electrode unit 193H and a branch electrode 194H, and the second subpixel electrode 191L may include a horizontal stem 192aL, a vertical stem 192bL, an external bundling electrode unit 193L and a branch electrode 194L. A slit pattern 195H may include slit patterns 195aH 195bH and 195cH, and slit pattern 195L may include slit patterns 195aL, 195bL and 195cL.

The partial reference line 131 may include first sustain electrode lines 135 and 136 and a reference electrode 137. Each of the first sustain electrode lines 135 and 136 is not connected to the partial reference line 131 in the drawings, but is provided with second sustain electrodes 138 and 139 overlapping the second sub-pixel electrode 191L.

The first panel 100 is provided with a plurality of gate conductors including a plurality of gate lines 121, a partial reference line 131, and a plurality of sustain electrode lines, on the first substrate 110. In an exemplary embodiment, the first substrate 110 may include glass or plastic such as soda-lime glass or borosilicate glass.

The gate lines 121 and the partial reference line 131 may be arranged in one direction, for example, length direction (e.g., horizontal direction in a plan view), and may transmit gate signals. The gate line 121 located between the first sub-pixel electrode 191H and the second sub-pixel electrode 191L may include a first gate electrode 124H and a second gate electrode 124L which partially protrude from this gate line 121, and a third gate electrode 124c which protrudes upwards. Here, the first gate electrode 124H and the second gate electrode 124L may be connected with each other to provide one protrusion.

The gate line 121 and other step-down gate lines may be respectively arranged.

The partial reference line 131 extends in the horizontal direction, and may transmit a determined voltage such as a common voltage. The partial reference line 131 may include first sustain electrodes 135 and 136, and may further include second sustain electrodes 138 and 139 which extend downwards.

Specifically, in the first sustain electrodes 135 and 136, the first vertical sustain electrode 135 is provided along the vertical edge of the first pixel electrode 191H. Further, in the second sustain electrodes 138 and 139, the second vertical sustain electrode 138 is provided along the longitudinal edge of the second pixel electrode 191L. In the second sustain electrodes 138 and 139, the second horizontal sustain electrode 139 is located between the horizontal edge of the second pixel electrode 191L and the horizontal edge of the first pixel electrode 191H, and the first and second horizontal sustain electrodes 136 and 139 may be provided along the two horizontal edges.

Consequently, the first vertical sustain electrode 135 and the first horizontal sustain electrode 136 are along the edge of the first pixel electrode 191H to at least partially overlap with the first pixel electrode 191H, and the second vertical sustain electrode 138 and the second horizontal sustain electrode 139 are along the edge of the second pixel electrode 191L to at least partially overlap with the second pixel electrode 191L.

Although it is shown in FIG. 1 that the first horizontal sustain electrode 136 located at the upper portion of FIG. 1 and the second horizontal sustain electrode 139 located at the lower portion of FIG. 1 are likely to be separated from each other, the above two horizontal sustain electrodes 136 and 139, which are disposed in the adjacent upper and lower pixels PX, are electrically connected with each other to surround the sub-pixel electrodes 191H and 191L belonging to one pixel in a ring shape, respectively.

Each of the gate line 121, partial reference line 131, and sustain electrode lines 135, 136, 138, and 139 may include the same material, and may be disposed on the same layer. In an exemplary embodiment, each of the gate line 121, partial reference line 131, and sustain electrode lines 135, 136, 138, and 139 may include aluminum-based metals such as aluminum (Al) and aluminum alloys, silver-based metals such as silver (Ag) and silver alloys, copper-based metals such as copper (Cu) and copper alloys, molybdenum-based metals such as molybdenum (Mo) and molybdenum alloys, chromium (Cr), titanium (Ti), or tantalum (Ta).

Further, each of the gate line 121, partial reference line 131, and sustain electrode lines 135, 136, 138, and 139 may have a multi-layer structure including two conductive films (not shown) whose physical properties are different from each other. In an exemplary embodiment, in the two conductive films, one conductive film may include a metal having low resistivity, such as an aluminum (Al)-based metal, a silver (Ag)-based metal, or a copper (Cu)-based metal, in order to reduce signal delay or voltage drop.

A gate insulating film 115 may be disposed on the entire surface of the first substrate 110 provided with the gate line 121, partial reference line 131, and sustain electrode lines 135, 136, 138, and 139. In an exemplary embodiment, the gate insulating film may include silicon oxide (SiOx) or silicon nitride (SiNx), for example.

Semiconductor layers 154H, 154L, and 154c may be disposed on the gate insulating film 115. The semiconductor layers 154H, 154L, and 154c may be disposed such that they at least partially overlap with gate electrodes 124H, 124L, and 124c. In an exemplary embodiment, each of the semiconductor layers 154H, 154L, and 154c may include oxide semiconductor including amorphous silicon, polycrystalline silicon, or zinc oxide (ZnO), for example.

A plurality of resistive (ohmic) contact members 163H, 165H, 163L, 165L, 163c, and 165c may be disposed on the semiconductor layers 154H, 154L, and 154c. Like the first resistive contact member disposed on the first semiconductor layer 154H, these resistive contact members 163H, 165H, 163L, 165L, 163c, and 165c may be disposed on their respective regions.

A plurality of data lines 171 including a first source electrode 173H and a second source electrode 173L, and a plurality of data conductors including a first drain electrode 175H, a second drain electrode 175L, a third source electrode 173c and a third drain electrode 175c are disposed on the resistive contact members 163H, 165H, 163L, 165L, 163c, and 165c and the gate insulating film 115. The data conductors and the semiconductors and resistive contact members located thereunder may be simultaneously provided using one mask. Further, each of the data lines 171 includes a wide end portion (not shown) for connection with another layer or an external driving circuit.

A data conductive layer is disposed on the semiconductor layers 154H, 154L, and 154c. The data conductive layer may include the data lines 171 extending in the vertical direction so as to cross the gate line 121.

The data lines 171 transmit data signals, and extend in the vertical direction to intersect with the gate lines 121 and the partial reference line 131. Each of the data lines 171 extends toward the first gate electrode 124H and the second gate electrode 124L, and may include the first source electrode 173H and the second source electrode 173L, which are connected with each other.

The data conductive layer may include the first source electrode 173H and the second source electrode 173L, which are connected to the data line 171, the first drain electrode 175H, which is spaced apart from the first source electrode 173H and faces the source electrode 173H, the second drain electrode 175L, which is spaced apart from the second source electrode 173L and faces the second source electrode 173L, the third source electrode 173c, which is electrically connected with the second source electrode 173L, and the third drain electrode 175c, which is spaced apart from the third source electrode 173c and faces the third source electrode 173c.

The end portions of the first drain electrode 175H and the second drain electrode 175L are partially surrounded by the first source electrode 173H and the second source electrode 173L. One wide end portion of the second drain electrode 175L extends again to provide a third source electrode 173c. One wide end portion of the third drain electrode 175c overlaps with the reference electrode 137 to be connected to a third contact hole 185c, and the other end portion thereof having a U-shape partially surround the third source electrode 173c.

In an exemplary embodiment, the semiconductor layers 154H, 154L, and 154c may have a substantially same plane shape with the data conductors 171, 175H, 175L, and 175c and the resistive contact members 164H, 164L, and 164c located thereunder, except for the channel regions between the source electrodes 173H, 173L, and 173c and the drain electrodes 175H, 175L, and 175c. That is, the semiconductor layers 154H, 154L, and 154c are provided with portions including the channel regions exposed by, i.e., not covered by, the data conductors 171, 175H, 175L, and 175c between the source electrodes 173H, 173L, and 173c and the drain electrodes 175H, 175L, and 175c.

The data lines 171 directly contact the semiconductor layers 154H, 154L, and 154c to provide ohmic contact. Each of the data lines 171 may be a single layer including a low-resistance material in order to perform an ohmic contact role together with the semiconductor layers 154H, 154L, and 154c. In an exemplary embodiment, each of the data lines 171 may include Cu, Al, or Ag, for example.

However, in order to improve the ohmic contact characteristics with the semiconductor layers 154H, 154L, and 154c, each of the data lines 171 may have a single-layer or multi-layer structure including Ni, Co, Ti, Ag, Cu, Mo, Al, Be, Nb, Au, Fe, Se, or Ta. Examples of the multi-layer structure may include double layer structures including Ta/Al, Ta/Al, Ni/Al, Co/Al, Mo(Mo alloy)/Cu, Mo(Mo alloy)/Cu, Ti(Ti alloy)/Cu, TiN(TiN alloy)/Cu, Ta(Ta alloy)/Cu, and TiOx/Cu, and triple layer structures including Ti/Al/Ti, Ta/Al/Ta, Ti/Al/TiN, Ta/Al/TaN, Ni/Al/Ni, and Co/Al/Co.

As such, the first, second and third gate electrodes 124H/124L/124c, the first, second and third source electrodes 173H/173L/173c, and the first, second and third drain electrodes 175H/175L/175c respectively define first, second and third thin film transistors ("TFTs") QH/QL/Qc together with the first, second and third semiconductor layers 154H/154L/154c, respectively. In this case, the channels of the TFTs may be provided in the semiconductor layers 154H/154L/154c between the source electrodes 173H/173L/173c and the drain electrodes 175H/175L/175c, respectively.

A protective film 180 may be disposed on the data conductors 171, 175H, 175L, and 175c and the exposed semiconductor layers 154H, 154L, and 154c. The protective film 180 may be an inorganic film or an organic film. The protective film 180 may have a double-layer structure of a lower inorganic film and an upper organic film in order to protect the semiconductor layers 154H, 154L, and 154c. Further, the protective film 180 may have a triple-layer structure of a lower inorganic film, an organic film disposed on the lower inorganic film, and another inorganic film disposed on the organic film. Here, as the organic film used in the protective film 180, a color filter may be used.

In an exemplary embodiment, for example, a lower protective film 180p including an inorganic insulating material such as silicon nitride or silicon oxide may be disposed on the data conductors 171, 175H, 175L, and 175c and the exposed semiconductor layers 154H, 154L, and 154c.

An organic film may be disposed on the lower protective film 180p. Here, a color filter 1800 may be used as the organic film. The color filter 1800 vertically extends along the space between the adjacent data lines 171. In an exemplary embodiment, the color filter 1800 may display one of the three primary colors of red, green and blue colors, for example. The color filters 1800 may be arranged on the data lines such that they overlap with each other.

An upper protective film 180q may be disposed on the lower protective film 180p exposed by an opening defined in the color filter 1800. The upper protective film 180q prevents the color filter 1800 from being lifted up, prevents the liquid crystal layer 300 from being contaminated by the organic matter, such as a solvent, inflowing from the color filter 1800, thereby preventing the defects such as residual images which may occur during screen driving. In an exemplary embodiment, the upper protective film 180q may include an inorganic insulating material such as silicon nitride or silicon oxide, or an organic material.

The lower protective film 180p, the color filter 1800, and the upper protective film 180q may be provided with a first contact hole 185H and a second contact hole 185L through which the end portion of the first drain electrode 175H and the end portion of the second drain electrode 175L are respectively exposed.

A plurality of pixel electrodes 191 is disposed on the upper protective film 180q. The pixel electrodes 191 may be connected to the first drain electrode 175H and the second drain electrode 175L through the first contact hole 185H and the second contact hole 185L, respectively. Each of the pixel electrodes 191 may include a transparent conductor such as indium tin oxide ("ITO") or indium zinc oxide ("IZO"). When a voltage is transmitted to the pixel electrodes 191 through the first drain electrode 175H and the second drain electrode 175L to which a data voltage is applied, these pixel electrodes 191 generate an electric field with the common electrode 270 disposed in the second panel 200, thereby rotating the liquid crystal molecules 302 in the liquid crystal layer 300 disposed between the first panel 100 and the second panel 200.

The pixel electrodes 191 may receive data voltage through the TFTs Q controlled by gate signals. In other words, the first sub-pixel electrode 191H and the second sub-pixel electrode 191L, shown in FIG. 1, are respectively connected with the first drain electrode 175H and the second drain electrode 175L through the first contact hole 185H and the second contact hole 185L, respectively, and may receive data voltage from the first drain electrode 175H and the second drain electrode 175L.

The pixel electrodes 191 may be respectively disposed in the pixels PX defined by the gate line 121 and the data line 171.

The pixel electrodes 191 are separated from each other by the gate line 121 disposed therebetween to be separately arranged in the upper and lower portions of the pixel region, and thus each of the pixel electrodes 191 may include the first sub-pixel electrode 191H and the second sub-pixel electrode 191L, which are neighbored in the column direction.

As such, when the first sub-pixel electrode 191H and the second sub-pixel electrode 191L are arranged in one pixel PX, a viewing angle may be improved. The pixel electrode 191 will be described in detail later with reference to FIG. 4.

The second panel 200 includes a second substrate 210, which faces the first substrate 110, and a common electrode 270. In an exemplary embodiment, the second substrate 210 may include transparent glass or plastic, and the common electrode 270 may be disposed on the second substrate 210.

In an exemplary embodiment, the light blocking member 330 and the color filter 1800 may be disposed on the second panel 200. The second substrate 210 may be selectively provided thereon with a light blocking member, a color filter, an overcoat film, and a second alignment film. In the exemplary embodiment, a color filter and a light blocking member is disposed on the second panel 200, similarly to the above-mentioned exemplary embodiment in which a color filter and a light blocking member is disposed on the first panel 100.

As such, when the color filter 1800 and the light blocking member 330 are disposed on the first substrate 110, it is possible to prevent the problem of the misalignment of wirings at the time of using the LCD in curved displays and to prevent the problem of causing the misalignment of liquid crystals at the time of determining the alignment direction with the second alignment film.

Briefly explaining the arrangement relation when a light blocking member, a color filter, an overcoat film, and a second alignment film are selectively disposed on the second substrate 210, a color filter of a plurality of colors may be disposed on the second substrate 210, and a light blocking member may be disposed at the boundary of the plurality of color filters. The color filter serves as a filter for transmitting the color of a specific wavelength, and the light blocking member, also referred to as a black matrix, may prevent the leakage of light and the color mixture of the color filter.

Further, an overcoat film and a second alignment film may be selectively disposed in the second panel 200. The overcoat film may be disposed on the front surface of the second substrate 210 provided with the color filter and the light blocking member. In an exemplary embodiment, the overcoat film may include an insulating material, and may provide a flat surface. In another exemplary embodiment, the overcoat film may be omitted.

A common electrode 270 may be disposed on the overcoat film. A second alignment film may be disposed on the common electrode 270, which is a vertically aligned film. In another exemplary embodiment, the second alignment film may be omitted. The common electrode 270 may be disposed on the second substrate 210 as an entire plate.

Hereinafter, the operation of the LCD configured as described above will be described with reference to FIG. 3. In the LCD according to the exemplary embodiment, one pixel may include a first switching element QH, a second switching element QL, and a third switching element Qc, each of which includes a TFT, and a first liquid crystal capacitor C1 and a second liquid crystal capacitor C2, each of which includes a dielectric composed of the liquid crystal layer 300.

The sources of the first switching element QH and the second switching element QL, that is, input terminals are connected to the data line DL, the gates thereof, that is, control terminals are connected to the gate line GL, and the gate of the third switching element Qc, that is, a control terminal is connected to the gate line GL.

The contact point CP of the drain of the second switching element QL and the source of the third switching element Qc may be connected to the second sub-pixel electrode 191L of the second liquid crystal capacitor C2, and the drain of the first switching element QH, that is, an output terminal may be connected to the first sub-pixel electrode 191H of the first liquid crystal capacitor C1. The ends of the first and second liquid crystal capacitors C1 and C2 may be connected to the common electrode 270. The drain of the third switching element Qc, that is, an output terminal is connected to the sustain electrode line 131. The second sub-pixel electrode 191L is electrically connected to the partial reference line RL through the third switching element Qc.

When a gate-on signal is applied to the gate line GL, the first switching element QH, the second switching element QL, and the third switching element Qc, which are connected to the gate line GL, may be turned on. Therefore, a data voltage applied to the data line DL is applied to the first sub-pixel electrode 191H through the first switching element QH. A voltage applied to the second sub-pixel electrode 191L may be divided through the third switching element Qc serially connected with the second switching element QL. Therefore, the voltage applied to the second sub-pixel electrode 191L may be lower than the voltage applied to the first sub-pixel electrode 191H.

Consequently, the voltage charged in the first liquid crystal capacitor C1 may be different from the voltage charged in the second liquid crystal capacitor C2. Since the voltage charged in the first liquid crystal capacitor C1 and the voltage charged in the second liquid crystal capacitor C2 are different from each other, the tilt angles of liquid crystal molecules in the first sub-pixel PXH and the second sub-pixel PXL are different from each other, and thus the brightnesses of the two sub-pixels may be different.

Therefore, when the voltage charged in the first liquid crystal capacitor C1 and the voltage charged in the second liquid crystal capacitor C2 are appropriately adjusted, the image viewed from the side may be substantially close to the image viewed from the front, and thus it is possible to improve the side visibility of the LCD.

In the illustrated embodiment, in order to differ the voltage charged in the first liquid crystal capacitor C1 and the voltage charged in the second liquid crystal capacitor C2 from each other, the LCD according to the exemplary embodiment includes the third switching element Qc connected to the second liquid crystal capacitor C2 and the partial reference line RL. However, in the case of an LCD according to another exemplary embodiment of the invention, the second liquid crystal capacitor C2 may be connected to a step-down capacitor.

Specifically, the LCD according to another exemplary embodiment of the invention includes a first terminal connected to a step-down gate line, a second terminal connected to the second liquid crystal capacitor C2, and a third terminal connected to a step-down capacitor. In the above described LCD, a part of the amount of electric charge charged in the second liquid crystal capacitor C2 is charged in the step-down capacitor, and thus a charging voltage between the first liquid crystal capacitor C1 and the second liquid crystal capacitor C2 may be set differently. Further, in the case of the LCD according to another exemplary embodiment of the invention, the first liquid crystal capacitor C1 and the second liquid crystal capacitor C2 are respectively connected to different data lines to receive data voltages different from each other, thereby setting the charging voltage between the first liquid crystal capacitor C1 and the second liquid crystal capacitor C2 differently. In addition, by different various methods, the charging voltage between the first liquid crystal capacitor C1 and the second liquid crystal capacitor C2 may also be set differently.

Referring to FIG. 4 in order to specifically explain the pixel electrode 191, the pixel PX may have a substantially rectangular shape, the pixel electrode 191 may be disposed to cover the pixel PX, and the common electrode 270 may be integrally disposed on the entire second panel 200.

When an electric field is generated in the liquid crystal layer 300 by providing a potential difference between the pixel electrode 191 and the common electrode 270, liquid crystal molecules 302 (refer to FIG. 2) may be arranged such that the major axis thereof are aligned in a direction perpendicular to the electric field. The degree of change in polarization of incident light in the liquid crystal layer 300 may be varied depending on the degree of inclination of the liquid crystal molecules 302. This change of polarization appears as the change of transmittance by first and second polarizing plates 140 and 240, and the LCD may display an image through the change of transmittance.

Further, in order to improve the viewing angle of the LCD displaying an image, a plurality of domains may be provided by patterning the pixel electrode 191 and the common electrode 270.

In an exemplary embodiment, for example, the pixel PX may include one pixel electrode 191 and the common electrode 270 corresponding to the pixel electrode 191. Here, as described above, when the pixel electrode is patterned, the liquid crystal molecules 302 having average liquid crystal azimuths different from each other may be divided into a plurality of domains having directions different from each other. Hereinafter, the liquid crystal molecules 302 having an average liquid crystal azimuth are referred to as "average liquid crystal azimuth 310".

As such, the pixel electrode 191 and protrusions 198H and 198L may be arranged in the region of the pixel PX divided into the plurality of domains. As described above, the pixel electrode 191 may include the first sub-pixel electrode 191H and the second sub-pixel electrode 191L. Hereinafter, for the convenience of explanation, the protrusions 198H and 198L respectively disposed on the first sub-pixel electrode 191H and the second sub-pixel electrode 191L are referred to as "a protrusion unit 198", and external bundling electrodes 193H and 193L are referred to as "an external bundling electrode unit 193".

The protrusion unit 198 may be disposed along the edge of the region of the pixel PX. The external bundling electrode unit 193, which is disposed in parallel to the protrusion unit 198, may be disposed in the region of the pixel PX. The external bundling electrode unit 193 may be disposed to contact the protrusion nit 198, or a part of the external bundling electrode unit 193 may be disposed to overlay the protrusion unit 198. Further, a part of the external bundling electrode unit 193 may be disposed to be overlaid on the protrusion unit 198.

In an exemplary embodiment, the protrusion unit 198 and the external bundling electrode unit 193 may be disposed on at least one side of the pixel PX when the pixel PX has a rectangular shape, for example. That is, the protrusion unit 198 and the external bundling electrode unit 193 may be disposed on at least one side of the pixel PX such that their edges are integrally provided. Further, some of the edges of the protrusion unit 198 and the external bundling electrode unit 193 may be integrally provided.

The protrusion unit 198 and the external bundling electrode unit 193 may be disposed in at least one of the plurality of domains Da, Db, Dc, and Dd. In the exemplary embodiment, it is shown that the external bundling electrode unit 193 is disposed in each of the first to forth domains Da, Db, Dc, and Dd in parallel to each of the horizontal/vertical stems 192a and 192b. However, the invention is not limited thereto.

In an exemplary embodiment, the width of each of the protrusion unit 198 and the external bundling electrode unit 193 may be in a range of about 7 micrometers (μm) to about 9 μm, for example. In an exemplary embodiment, the width of the protrusion unit 198 may be in a range of about 3 μm to about 5 μm, for example.

The protrusion unit 198 and the external bundling electrode unit 193 may be disposed such that they are partially overlaid. In order to align the protrusion unit 198 and the external bundling electrode unit 193, a region in each which the protrusion unit 198 and the external bundling electrode unit 193 are partially overlaid may be provided. However, as the area of this region decreases, the exposed area of the external bundling electrode unit 193 increases, thereby improving transmittance.

In an exemplary embodiment, the height of the protrusion unit 198 taken along a cross sectional direction may be in a range of about 0.5 μm to about 2 μm, for example. When the height of the protrusion unit 198 is too high, the height thereof becomes equal to that of a spacer because the protrusion unit 198 overlaps with the cell gaps of the liquid crystal layer 300. Therefore, when the height of the protrusion unit 198 becomes approximately equal to that of the spacer, the fluidity of liquid crystals becomes poor, dark spot defects may occur in the vicinity of the protrusion unit 198. Further, when the height of the protrusion unit 198 is too low, it may be difficult to define a pretilt angle of liquid crystals, the pretilt angle being caused by the surface level difference of the protrusion unit 198. Therefore, the height of the protrusion unit 198 may be in a range of about 0.5 μm to about 2 μm, for example.

As shown in FIG. 4, the pixel electrode 191 includes the external bundling electrode unit 193 disposed along the edge of the pixel PX, and a horizontal stem 192a and a vertical stem 192b which are connected to the external bundling electrode unit 193 and divide the pixel PX into a plurality of domains. Here, the plurality of domains divided by the horizontal stem 192a and the vertical stem 192b includes a branch unit 194 extending to the horizontal stem 192a and the vertical stem 192b. The branch unit 194 includes branch electrodes 194a, 194b, 194c, and 194d which are respectively disposed in the domains.

Further, in the pixel PX, slit patterns 195a, 195b, and 195c constituting a slit pattern unit 195 may be disposed between the branch electrodes 194a, 194b, 194c, and 194d. Here, each of the slit patterns 195 is defined by partially removing each of the branch electrodes 194a, 194b, 194c, and 194d to expose the insulating film including the protective film 180 disposed under the pixel electrode 191.

For the convenience of explanation, one domain, that is, the first domain Da will be representatively described. A first slit pattern 195a which may separate the respective branch electrodes 194a, 194b, 194c, and 194d, a second slit pattern 195b which contacts the vertical stem 192b and is disposed in parallel to the horizontal stem 192a, and a third slit pattern 195c which contacts the horizontal stem 192a and is disposed in parallel to the vertical stem 192b may be included in the slit pattern unit 195. Here, the second slit pattern 195b and the third slit pattern 195c are connected to each other. Further, the first, second, and third slit patterns 195a, 195b, and 195c may be disposed at regular widths.

The second slit pattern 195b may be disposed between the right region of the external bundling electrode unit 193 and the end of the first branch electrode 194a to separate the end of the first branch electrode 194a from the external bundling electrode unit 193. In other words, the second slit pattern 195b may be disposed along the upper end of the first branch electrode 194a.

The third slit pattern 195c may be disposed between the upper region of the external bundling electrode unit 193 and the end of the first branch electrode 194a to separate the end of the first branch electrode 194a from the external bundling electrode unit 193. In other words, the third slit pattern 195c may be disposed along the right end of the first branch electrode 194a.

Therefore, due to the arrangement of the second and third slit patterns 195b and 195c, one end of at least one of the branch electrodes 194a, 194b, 194c, and 194d may be disposed to contact the stem unit 192, and the other end of at least one of the branch electrodes 194a, 194b, 194c, and 194d may be disposed to contact the second and third slit patterns 195b and 195c. Similarly to the first domain Da, each of the second, third, and fourth domains Db, Dc, and Dd may also be provided with the first, second, and third slit patterns 195a, 195b, and 195c.

As such, one pixel PX may be provided with the protrusion unit 198 and the pixel electrode 191, and the protrusion unit 198 may be disposed to surround the edge of the pixel electrode 191. Further, the pixel electrode 191 is configured such that the external bundling electrode unit 193 which contacts the protrusion unit 198 and are disposed in parallel to the protrusion unit 198, the horizontal and vertical stems 192a and 192b which are connected to the external bundling electrode unit 193 and divide the pixel PX into a plurality of domains, and the branch unit 194 extending to the horizontal stem 192a and the vertical stem 192b to be connected with the external bundling electrode unit 193 are integrally provided. Therefore, the integrally provided external bundling electrode unit 193, horizontal and vertical stems 192a and 192b, and branch electrodes 194a, 194b, 194c, 194d may receive the same voltage. Moreover, a plurality of domains may be provided by the horizontal and vertical stems 192a and 192b while receiving the same voltage.

Therefore, the pixel PX may include four domains, in which the horizontal stem 192a and vertical stem 192b of the pixel electrode 191 are defined as boundaries, that is, the first to fourth domains. In an exemplary embodiment, the width of the stem unit 192 may be about 2 μm to 5 μm, for example, and when necessary, the width thereof may be adjusted in order to improve the control of liquid crystals.

In other words, in the region provided with the stem unit 192, aperture ratio may be reduced because liquid crystal molecules 302 are not laid down. When the width of the stem unit 192 greatly increases, aperture ratio and transmittance may be reduced due to the increase in the fringe field at the boundary between the first to fourth domains Da, Db, Dc, and Dd, so that it is possible to prevent the transmittance of the pixel from being reduced by adjusting the width of the stem unit 192. In the intersection region of the horizontal and vertical stems 192a and 192b, unlike FIG. 4, the electrode area of the intersection region may be adjusted.

The pixel PX is divided by the horizontal and vertical stems 192a and 192b to define the first to fourth domains Da, Db, Dc, and Dd. The branch unit 194 extending from each of the horizontal and vertical stems 192a and 192b may be disposed in the pixel PX. Further, the branch unit 194 may include the plurality of first to fourth branch electrodes 194a, 194b, 194c, and 194d which are respectively disposed in the first to fourth domains Da, Db, Dc, and Dd. Hereinafter, the first to fourth branch electrodes 194a, 194b, 194c, and 194d are collectively referred to as "branch electrodes 194a, 194b, 194c, and 194d" for convenience.

In the branch unit 194, the first branch electrode 194a may be disposed in the first domain Da to be obliquely extended from the horizontal and vertical stems 192a and 192b in the upper right direction, and the second branch electrode 194b may be disposed in the second domain Db to be obliquely extended from the horizontal and vertical stems 192a and 192b in the upper left direction. Further, the third branch electrode 194c may be disposed in the third domain Dc to be obliquely extended from the horizontal and vertical stems 192a and 192b in the lower left direction, and the fourth branch electrode 194d may be disposed in the fourth domain Dd to be obliquely extended from the horizontal and vertical stems 192a and 192b in the lower right direction.

In an exemplary embodiment, the first and second branch electrodes 194a and 194b may be disposed at angles of about 45 degrees (°) and about 135° with reference to the horizontal stem 192a, respectively. In an exemplary embodiment, the third and fourth branch electrodes 194c and 194d may be disposed at angles of about 225° and about 315° with reference to the horizontal stem 192a, respectively. The branch electrodes 194a to 194d of the adjacent two domains Da and Dd may be disposed in a direction perpendicular to each other.

In other words, the branch electrodes 194a, 194b, 194c, and 194d may be arranged such that, for example, in the first domain Da, the extension direction of the first branch electrode 194 is disposed at an angle of about 30° to about 60° with reference to the polarization axis of the polarizing plate 140 or 240, for example.

As such, when the branch unit 194 extends from any one of the horizontal and vertical stems 192a and 192b, texture is reduced and transmittance is improved with the improvement of control of liquid crystals. Here, the branch electrodes 194a, 194b, 194c, and 194d may be arranged to be symmetrical to each other in each domain. That is, the branch electrodes 194a, 194b, 194c, and 194d may be arranged such that the ends of the branch electrodes 194a, 194b, 194c, and 194d correspond to the ends of the branch electrodes 194a, 194b, 194c, and 194d of the adjacent pixel PX.

The branch electrodes 194a, 194b, 194c, and 194d may be asymmetrically extended and arranged. That is, the branch electrodes 194a, 194b, 194c, and 194d may be arranged such that the ends of the branch electrodes 194a, 194b, 194c, and 194d correspond to the slit pattern unit 195 of the adjacent pixel PX. Here, when the branch electrodes 194a, 194b, 194c, and 194d are asymmetrically extended and arranged, the performance of control of liquid crystals may be effectively improved. That is, the branch electrodes 194a, 194b, 194c, and 194d disposed in the domain and the slit pattern unit 195 in the domain adjacent to this domain may be alternately arranged.

As such, when the protrusion unit 198 is disposed in the edge region of the pixel PX, and the pixel electrode 191, including the external bundling electrode unit 193 disposed in parallel to the protrusion unit 198, the horizontal and vertical stems 192a and 192b connected to the external bundling electrode unit 193 and dividing the pixel PX into a plurality of domains, and the branch unit 194 extending in a diagonal direction with reference to the intersection of the horizontal and vertical stems 192a and 192b, is disposed in the pixel PX, the liquid crystal molecules 302 having the average liquid crystal azimuth 310 capable of exhibiting the maximum transmittance may be provided.

Here, the sides of the first to fourth branch electrodes 194a, 194b, 194c, and 194d distort an electric field to define horizontal components that determine the inclination direction of the liquid crystal molecules 302. The horizontal components of the electric field may arrange the liquid crystal molecules 302 in a direction parallel to the length direction of the first to fourth branch electrodes 194a, 194b, 194c, and 194d by the behavior of the liquid crystal molecules 302. Therefore, as described in FIGS. 1 to 4, the liquid crystal molecules 302 may be inclined in a direction parallel to the length direction of the first to fourth branch electrodes 194a, 194b, 194c, and 194d. Since one pixel electrode 191 includes four domains Da to Dd, in which length directions of the branch electrodes 194a, 194b, 194c, and 194d are different from each other, the liquid crystal molecules 302 are inclined in approximately four directions, and the four domains Da to Dd, in which the alignment directions of liquid crystal molecules 302 are different, may be provided in one sub-pixel.

Further, the liquid crystal molecules 302 irregularly arranged at the edge of the domain may be arranged in a direction similar to the average liquid crystal azimuth 310 through the second and third slit patterns 195b and 195c, the protrusion unit 198 and the external bundling electrode unit 193.

The branch electrodes 194a to 194d and the slit patterns 195a, 195b, and 195c may be arranged at regular widths. Further, the width of the external bundling electrode unit 193 may be the same as that of each of the branch electrodes 194a to 194d. In an exemplary embodiment, the width of the external bundling electrode unit 193 may be in a range of about 1 µm to about 5 µm, for example. Specifically, the width of the external bundling electrode unit 193 may be in a range of about 2 µm to about 4 µm, for example.

As such, since the intervals between the external bundling electrode unit 193 and the branch electrodes 194a to 194d are similar to each other, the electric field forces between the branch electrodes 194a to 194d are similar to each other. Therefore, it is possible to prevent the liquid crystal molecules 302 from being biased in any one direction.

In an exemplary embodiment, the pitches of the branch electrodes 194a to 194d and the first slit pattern 195a may be in a range of about 4 µm to about 8 µm, for example. More specifically, the pitches of the branch electrodes 194a to 194d and the first slit pattern 195a may be in a range of about 5 µm to about 7 µm, for example. In an exemplary embodiment, the widths of the second and third slit patterns 195b and 195c and the external bundling electrode unit 193 may be in a range of about 4 µm to about 8 µm, and more specifically about 5 µm to about 7 µm, for example.

In an exemplary embodiment, the lengths of the branch electrodes 194a to 194d, that is, the lengths of the branch electrodes 194a to 194d, which extend from the intersection region of the stem unit 192 to the corner region of the pixel PX, may be in a range of about 25 μm to about 30 μm, for example, in which liquid crystal control is possible. Specifically, the lengths from the ends of the branch electrodes 194a to 194d to the corner region of the pixel PX may be in a range of about 26 μm to about 28 μm, for example.

When the liquid crystal molecules 302 in the above described domains Da, Db, Dc, and Dd have an average liquid crystal azimuth 310, which is an average alignment direction of the liquid crystal molecules 302, the average liquid crystal azimuth 310 may be inclined in a direction consisting of the sum of a vector caused by the electric field in each of the corresponding domains Da, Db, Dc, and Dd and a vector caused by the collision of liquid crystals. That is, the liquid crystal molecules 302 may define an azimuth similar to the extending direction of the branch electrodes 194a, 194b, 194c, and 194d. The liquid crystal molecules 302 in each of the domains Da, Db, Dc, and Dd may be aligned to have the average liquid crystal azimuth in the direction represented by arrows a, b, c, and d, as seen in plan view.

Specifically, the liquid crystal molecules 302 may be arranged in a direction approximately parallel to the direction from four points at which the edges of the pixel electrode, extending in the different directions, meet each other toward the center of the horizontal and vertical stems 192a and 192b. Therefore, the liquid crystal molecules 302 are arranged in a direction similar to the direction in which the branch electrodes 194a to 194d are extended by the influence of an electric field in each of the domains Da, Db, Dc, and Dd, and the number of the tilting directions of the liquid crystal molecules 302 in each region of an electric field forming electrode may be four.

As such, the liquid crystal molecules 302 may define the average liquid crystal azimuth in a direction similar to the extending direction of the branch electrodes 194a, 194b, 194c, and 194d in each of the domains Da, Db, Dc, and Dd.

Therefore, in the illustrated exemplary embodiment of the invention, since the branch electrodes 194a to 194d of one pixel PX extend in four longitudinal directions, the liquid crystal molecules 302 may also be tilted in four directions. As such, when the tilting direction of the liquid crystal molecules 302 becomes various, the transmittance and reference viewing angle of the LCD may be increased.

Figure 5:
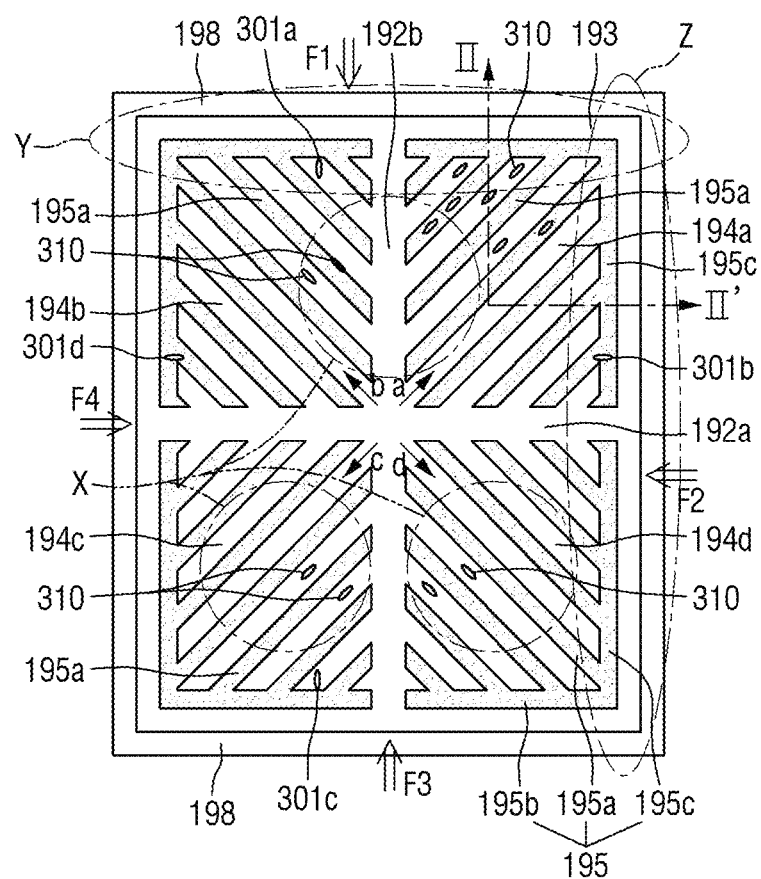
FIG. 5 is a plan view showing an exemplary embodiment of the liquid crystal behavior of the LCD according to the invention.
Figure 6:
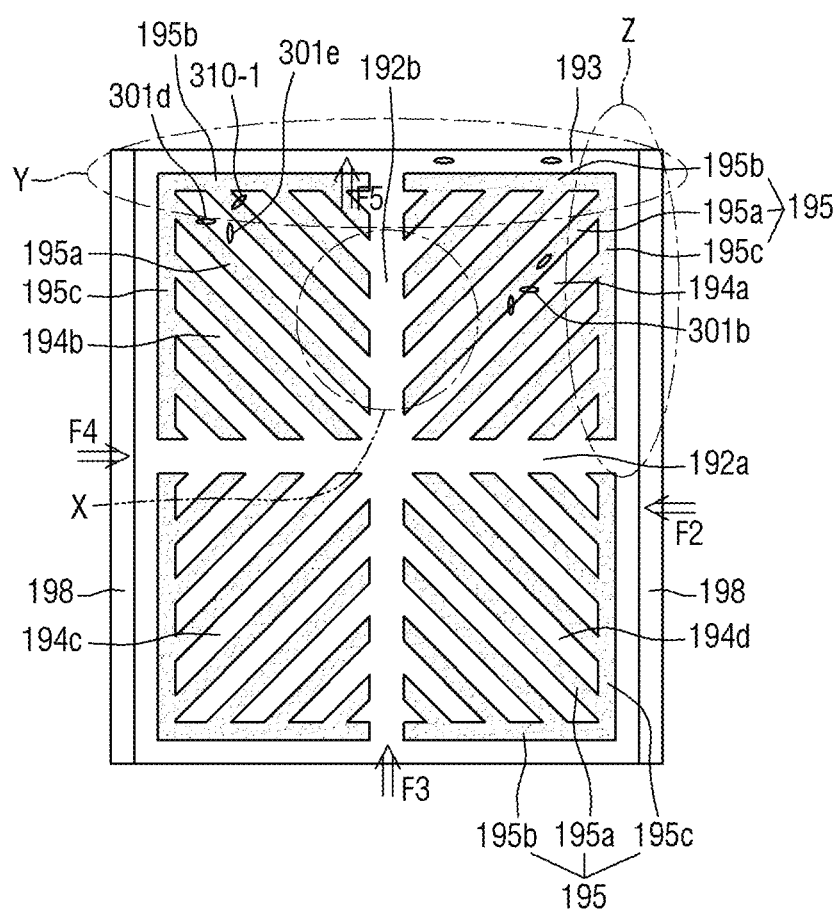
FIG. 6 is an enlarged plan view of another exemplary embodiment of one pixel according to the invention.
Figure 7:
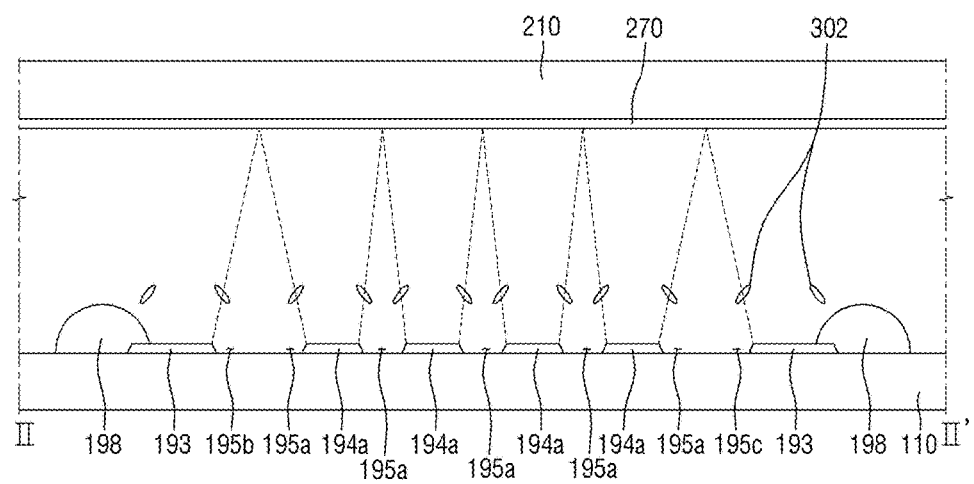
FIG. 7 is a cross-sectional view taken along line II-II' of FIG. 5.

FIG. 5 is a plan view showing a liquid crystal behavior of the LCD device according to an exemplary embodiment of the invention, FIG. 6 is an enlarged plan view of one pixel according to another exemplary embodiment of the invention, and FIG. 7 is a cross-sectional view taken along line II-II of FIG. 5.

Here, it is shown in FIGS. 5 to 7 that an LCD includes one pixel PX, but the LCD may include a plurality of pixels repeatedly arranged in rows and columns. Here, the behavior of liquid crystals will be described by reference to FIGS. 1 to 4, and one pixel will be representatively described for example.

First, the LCD according to the embodiment of invention is configured such that, when a voltage is applied between the pixel electrode 191 and the common electrode 270, the behavior of the liquid crystal molecules 302 is changed, and the refractive index of liquid crystals is changed, thereby realizing gradation.

The LCD according to the embodiment of invention may exhibit high contrast ratio due to excellent dark characteristics, whereas the transmittance of liquid crystals depending on the behavior of the liquid crystal molecules 302 may be greatly changed depending on a viewing angle because negative liquid crystals are used. That is, the LCD is vulnerable to a viewing angle because the transmittance of liquid crystals is changed depending on the viewing angle.

In order to solve the problem with the view angle of the LCD, as described in FIGS. 1 and 2, an electrode is provided in each of the first panel 100 and the second panel 200 to define a plurality of domains changing the behavior direction of the liquid crystal molecules 302. Here, the electrode may be a pixel electrode 191 or a common electrode 270.

As such, when the plurality of domains Da to Dd is provided, the difference in refractive index of liquid crystals depending on the direction of a viewing angle may be minimized, thereby improving visibility. However, although the difference in refractive index of liquid crystals depending on the direction of a viewing angle is minimized using a structure of the plurality of domains Da to Dd, there may be still a problem that a gradation curve is distorted at the lateral side of the LCD.

The reason for this is because there may be a problem that the structure of the plurality of domains Da to Dd deteriorates light efficiency due to the disclination line located at the lateral side of the pixel PX. The reason for this is because, at the time of implementing a bright state and a dark state, some of the liquid crystal molecules 302 are behaved in a direction matching the polarization axis of the polarizing plate 140 or 240, and thus disclination lines are generated.

In order to solve the above problems, as described in FIGS. 1 and 2, the distortion of a gradation curve in the low gradation region (dark state) and the high gradation region (bright state) may be reduced by changing the electrode pattern 191. Further, the difference in transmittance at the time of low gradation and high gradation may be reduced to minimize the distortion of a gradation curve, thereby improving visibility.

Hereinafter, the behavior of liquid crystal molecules will be described in detail. In FIGS. 5 to 7, the behavior of liquid crystal molecules will be described with respect to one pixel.

In FIG. 5, an external bundling electrode 193 including external bundling electrodes 193H and 193L (refer to FIG. 1) is disposed at both lateral sides and upper and lower sides of a pixel PX. In FIG. 6, an external bundling electrode 193 including external bundling electrodes 193H and 193L is disposed at both lateral sides of the pixel PX. In FIG. 7, in order to express the behavior of liquid crystals, the cross section of the corner region of the pixel PX is shown.

Explaining the behavior of the liquid crystal molecules 302 with reference to FIGS. 5 to 7, a data voltage is applied to the pixel electrode 191, and a common voltage is applied to the common electrode 270, thereby generating an electric field in the liquid crystal layer 300 between the two electric field generating electrodes.

In response to the electric field, the liquid crystal molecules 302 of the liquid crystal layer 300 may be defined by fringe fields F1 to F4 generated by the slit pattern unit 195 of the common electrode 270 and the pixel electrode 191. Hereinafter, the horizontal electric field component in the first direction, which provides a behavior of the liquid crystal molecules 302 to the fringe field, is referred to as "first horizontal electric field F1", the horizontal electric field component in the second direction is referred to as "second horizontal electric field F2", the horizontal electric field component in the third direction is referred to as "third horizontal electric field F3", and the horizontal electric field component in the fourth direction is referred to as "fourth horizontal electric field F4".

Here, the fringe field may include a first director 301*a* of the liquid crystal molecules 302 (refer to FIG. 2) by the first horizontal electric field F1 which is provided in a direction from two edge sides of the pixel electrode 191, that is, the upper sides of the first domain Da and the second domain Db to the inside of the pixel PX, and a second director 301*b* of the liquid crystal molecules 302 by the second horizontal electric field F2 which is provided in a direction from the right sides of the first domain Da and the fourth domain Dd to the inside of the pixel PX.

Further, the fringe field may include a third director 301*c* of the liquid crystal molecules 302 by the third horizontal electric field F3 which is provided in a direction from two edge sides of the pixel electrode 191, that is, the lower sides of the third domain Dc and the fourth domain Dd to the inside of the pixel PX, and a fourth director 301*d* of the liquid crystal molecules 302 by the fourth horizontal electric field F4 which is provided in a direction from the left sides of the second domain Db and the third domain Dc to the inside of the pixel PX.

As such, the first to fourth directors 301*a* to 301*d* of the liquid crystal molecules 302 by the first to fourth horizontal electric fields F1 to F4 which are provided in the inner direction of the pixel PX may be inclined approximately parallel to the polarization axis of each of the polarizing plates 140 and 240. That is, the liquid crystal molecules 302 in one pixel PX may be inclined in four directions.

More specifically, each of the first and second directors 301*a* and 301*b* of the liquid crystal molecules 302 at the region adjacent to the edge of the pixel electrode 191 in one pixel PX may be disposed perpendicular to the edge of the pixel electrode 191. Like this, the directors 301*a*, 301*b*, 301*c*, and 301*d* of the liquid crystal molecules 302 by the fringe field generated at the edge of the pixel electrode 191 in one pixel PX may be primarily determined. Here, due to the directors 301*a*, 301*b*, 301*c*, and 301*d* of the liquid crystal molecules 302 by the fringe field, a force for providing the behavior of the liquid crystal molecules 302 in a direction to the inside of the pixel PX may be provided by the protrusions 198.

Like this, due to the primary behavior of the liquid crystal molecules 302 in a direction approximately parallel to the polarization axis of each of the polarizing plates 140 and 240 by the fringe fields F1 to F4 provided by electrodes, these liquid crystal molecules 302 may be provided into the first to fourth directors 301*a*, 301*b*, 301*c*, and 301*d*.

The liquid crystal molecules 302 behaved by the first to fourth directors 301*a*, 301*b*, 301*c*, and 301*d* may be secondarily arranged in a direction in which the liquid crystal molecules 302 meet each other in the pixel PX to minimize the distortion thereof. Here, the secondary arrangement direction of the first to fourth directors 301*a*, 301*b*, 301*c*, and 301*d* may be a direction of the sum of vectors of these directors.

Therefore, due to the behavior of the liquid crystal molecules 302 in the direction of the sum of vectors of the directors, the average liquid crystal azimuth 310 may be provided in a direction similar to the extending direction of the branch electrodes 194*a*, 194*b*, 194*c*, and 194*d* in each of the domains Da, Db, Dc, and Dd. That is, the liquid crystal molecules 302 may be arranged in each of the domains Da, Db, Dc, and Dd in the pixel PX to have average liquid crystal azimuths 310 different from each other.

Further, the first to fourth directors 301*a*, 301*b*, 301*c*, and 301*d* may be also provided at the branch electrodes 194*a*, 194*b*, 194*c*, and 194*d* disposed between the first, second, and third slit patterns 195*a*, 195*b*, and 195*c*.

Specifically, the sides of the branch electrodes 194*a* to 194*d* make horizontal components perpendicular to the sides thereof by distorting an electric field, and the tilt direction of the liquid crystal molecules 302 may be determined by the fringe fields F1 to F4. Therefore, the liquid crystal molecules 302 are first inclined in a direction perpendicular to the sides of the branch electrodes 194*a* to 194*d*.

Here, since the horizontal components of the electric field by the adjacent branch electrodes 194*a* to 194*d* are arranged in a direction opposite to each other, and the intervals between branch electrodes 194*a* are narrow, the liquid crystal molecules to be inclined in a direction opposite to each other may be inclined altogether in a direction parallel to the longitudinal direction of the branch electrodes 194*a* to 194*d*.

Therefore, in the embodiment of the invention, the liquid crystal molecules 302 may be inclined in two stages in the length direction of the branch electrodes 194*a* to 194*d*. Moreover, when the liquid crystal molecules 302 are secondarily arranged to dispose the protrusions 198 at the edge of the pixel PX, the liquid crystal molecules 302 are pre-inclined in a direction parallel to the length direction of the branch electrodes 194*a* to 194*d*, and thus the liquid crystal molecules 302 may be arranged in a direction parallel to the length direction of the branch electrodes 194*a* to 194*d*.

As such, since the liquid crystal molecules 302 may be inclined in the direction of each of the first to fourth directors 301*a*, 301*b*, 301*c*, and 301*d* by the influence of the fringe fields F1 to F4 by disposing the slit pattern unit 195 in the pixel PX, it is possible to improve the response speed of the LCD.

As described above, due to the behavior of the liquid crystal molecules 302, the average liquid crystal azimuths in the domains Da, Db, Dc, and Dd may be made different, respectively.

In the first domain Da of the pixel PX, the director of the liquid crystal molecules 302 is obliquely disposed in the upper right direction of the horizontal stem 192*a* to define an average liquid crystal azimuth 310 in the direction of arrow a.

In the second domain Db of the pixel PX, the directors of the liquid crystal molecules 302 is obliquely disposed in the upper left direction of the horizontal stem 192*a* to define an average liquid crystal azimuth 310 in the direction of arrow b.

In the third domain Dc of the pixel PX, the directors of the liquid crystal molecules 302 is obliquely disposed in the lower left direction of the horizontal stem 192*a* to define an average liquid crystal azimuth 310 in the direction of arrow c.

In the fourth domain Dd of the pixel PX, the directors of the liquid crystal molecules 302 is obliquely disposed in the lower right direction of the horizontal stem 192*a* to define an average liquid crystal azimuth 310 in the direction of arrow d.

Therefore, since the arrangement of the liquid crystals may be controlled such that the arrangement directions thereof are different from each other along the longitudinal direction of the branch electrodes 194*a* to 194*d* disposed in a plurality of domains, it is possible to improve the lateral visibility of the LCD of the invention.

Referring to FIG. 6, in one pixel, the region in which the branch unit 194 adjacent to the intersection of the stem unit 192 is disposed is defined as a first region X. In the first region X, the liquid crystal molecules 302 may be arranged in the direction of the average liquid crystal azimuth 310 similar to the extending direction of the branch electrodes

194a, 194b, 194c, 194d by the force of the fringe fields F1 to F4 and the collision of the liquid crystal molecules 302.

The upper edge region of the pixel PX, which is spaced apart from the stem unit 192, is defined as a second region Y, and the right edge region of the pixel PX is defined as a third region Z. In FIG. 6, the region in which the external bundling electrode unit 193 and the protrusion unit 198 are disposed in the pixel electrode 191 is defined as the third region Z. The region in which the external bundling electrode unit 193 or the protrusion unit 198 is not disposed in the pixel electrode 191 is defined as the second region Y.

Since the protrusion unit 198 provided at the edge of the pixel PX does not exist in the second region Y, a fifth horizontal electric field component F5 applied in the direction to outside of the pixel PX may be provided.

As such, in the second region Y, due to the fifth horizontal electric field component F5, a fifth director 301e may be provided. Therefore, when the fifth director 301e behaved by the fifth horizontal electric field component F5 respectively collides with the second director 301b behaved by the second horizontal electric field component F2 and the fourth director 301d behaved by the fourth horizontal electric field component F4, the liquid crystal molecules 302 in the second region Y may be liquid crystal molecules 302 having a liquid crystal azimuth different from the average liquid crystal azimuth 310. The liquid crystal molecules 302 having the above liquid crystal azimuth are referred to as liquid crystal molecules 302 having a fifth liquid crystal azimuth 310-1.

As described above, due to the liquid crystal molecules 302 having the fifth liquid crystal azimuth 310-1 different from the average liquid crystal azimuth 310, in the second region, the fifth liquid crystal azimuth 310-1 is away from the polarization axis by more than about 45° deteriorating transmittance, and thus texture may occur.

As such, in the second region Y, the vector capable of secondarily behaving the liquid crystal molecules 302 having the second director 301b, that is, the first horizontal electric field F1 is weak, or the fifth horizontal electric field F5 opposite to the first horizontal electric field F1 is provided, so that liquid crystal molecules 302 lying in parallel to the horizontal stem 192a may be provided. Moreover, due to the component of the fifth horizontal electric field F5, liquid crystal molecules 302 behaving from acute angle to obtuse angle may be provided.

Therefore, among the liquid crystal molecules 302 behaved by the fringe fields F1 to F4, some of the liquid crystal molecules 302 disposed in the second region Y may be arranged in a direction approximately parallel to the polarization axis of the polarizing plate 140 or 240 or may have the fifth liquid crystal azimuth 301-1 from acute angle to obtuse angle.

The LCD may exhibit the maximum transmittance when the average liquid crystal azimuth 310 is designed to be tilted about 45° with reference to the polarization axis of the polarizing plate 140 or 240 at the time of applying a voltage to the first and second panels 100 and 200.

However, as described above, in the second region Y of the pixel PX, in which the protrusion unit 198 is not disposed, the fifth director 301e aligned in a direction approximately parallel to the polarization axis may be provided, or the fifth liquid crystal azimuth 310-1 from acute angle to obtuse angle may be provided. As such, in the second region Y of the pixel PX, due to the liquid crystal molecules 302 lying in a direction similar to the polarization axis of the polarizing plate 140 or 240, the transmittance of the LCD may be deteriorated. That is, in the second region Y, the angle of the liquid crystal molecules 302 is away from the polarization axis of the polarizing plate 140 or 240 by more than about 45°, and thus the transmittance of the LCD may be deteriorated.

In the third region Z in which the external bundling electrode unit 193 and the protrusion unit 198 are arranged, the protrusion unit 198 is disposed at the edge region of the pixel PX, and thus the pretilt angle of the liquid crystal molecules 302 in the third region Z may be provided.

In other words, due to the pretilt angle provided by the protrusion unit 198, the force of boosting the liquid crystal molecules 302 is greatly increased even when the fifth horizontal electric field F5, which is aligned in a direction opposite to the first horizontal electric field F1 in the third region Z, is provided. Therefore, in the third region Z, the liquid crystal molecules 302 arranged in a direction similar to the average liquid crystal azimuth 310 may be provided.

Therefore, the protrusion unit 198 may provide a force of arranging the liquid crystal molecules 302 in a direction similar to the average liquid crystal azimuth 310 by forming a pretilt angle. Further, the second slit pattern 195b and the third slit pattern 195c may minimize the formation of the fifth director 301e in the second region Y by weakening the electric field for defining a director such as the fifth horizontal electric field F5.

Therefore, in the edge region of the pixel PX, that is, the third region Z, the liquid crystal molecules 302 may be arranged in the direction of a pretilt angle, and thus the liquid crystal molecules 302 may be arranged relatively close to the average alignment direction of the liquid crystal molecules 302 in each of the domains Da to Dd, that is, the average liquid crystal azimuth 310. Therefore, it is possible to minimize the irregular arrangement of the liquid crystal molecules 302 occurring in the second region Y which is an edge region of the pixel PX.

As described above, in the LCD, the protrusion unit 198 is disposed along the edge of the pixel PX to arrange the liquid crystal molecules 302 in the direction of the average liquid crystal azimuth 310, thereby improving the transmittance and lateral viewing angle of the third region Z. Moreover, it is possible to improve response speed by reducing the area of the pixel electrode 191.

Figure 8:
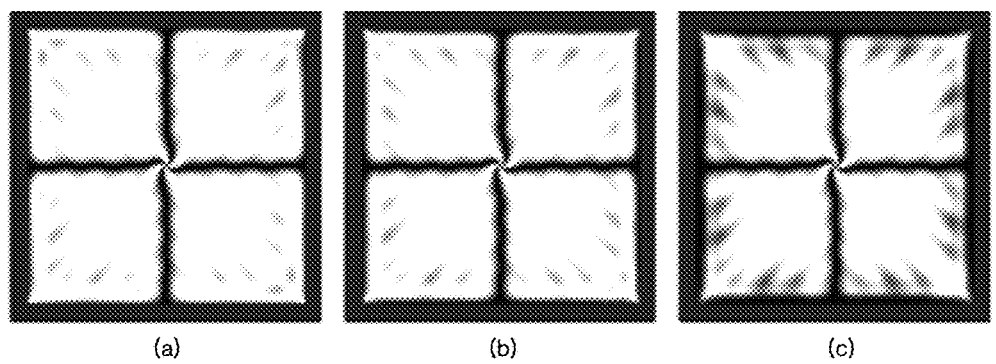
FIGS. 8 and 9 are photographs showing examples of the transmittance of pixels according to the invention.
Figure 9:
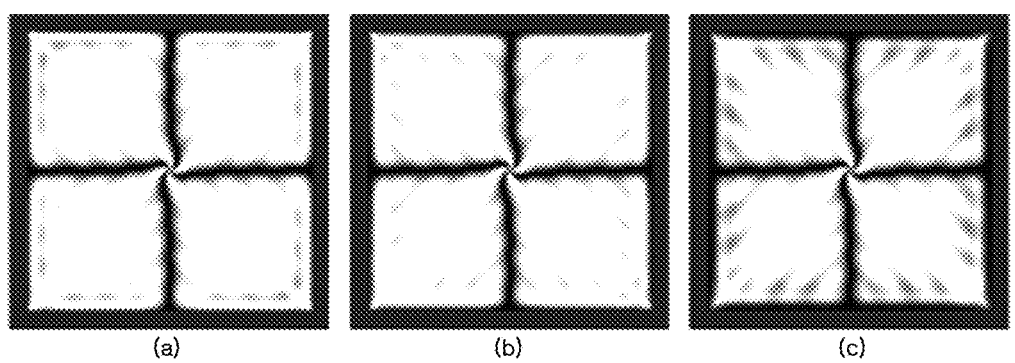
Figure 10:
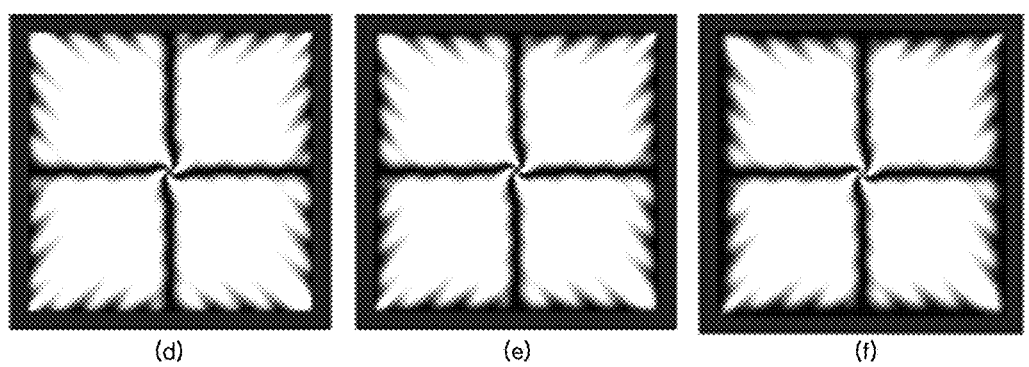
FIGS. 10 and 11 are photographs showing examples and comparative Examples of the transmittance of pixels according to the invention.
Figure 11:
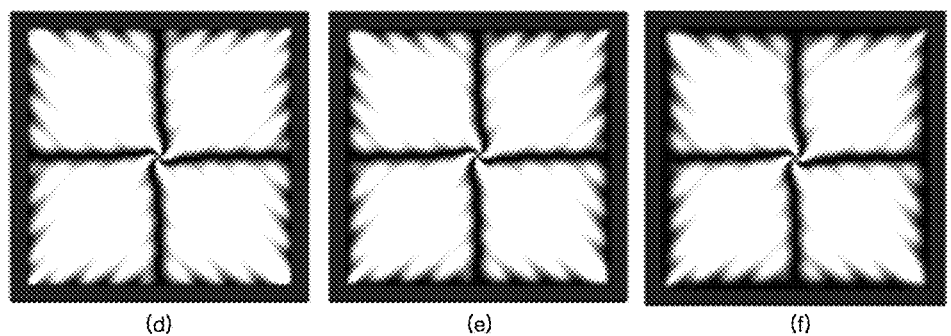
Figure 12:
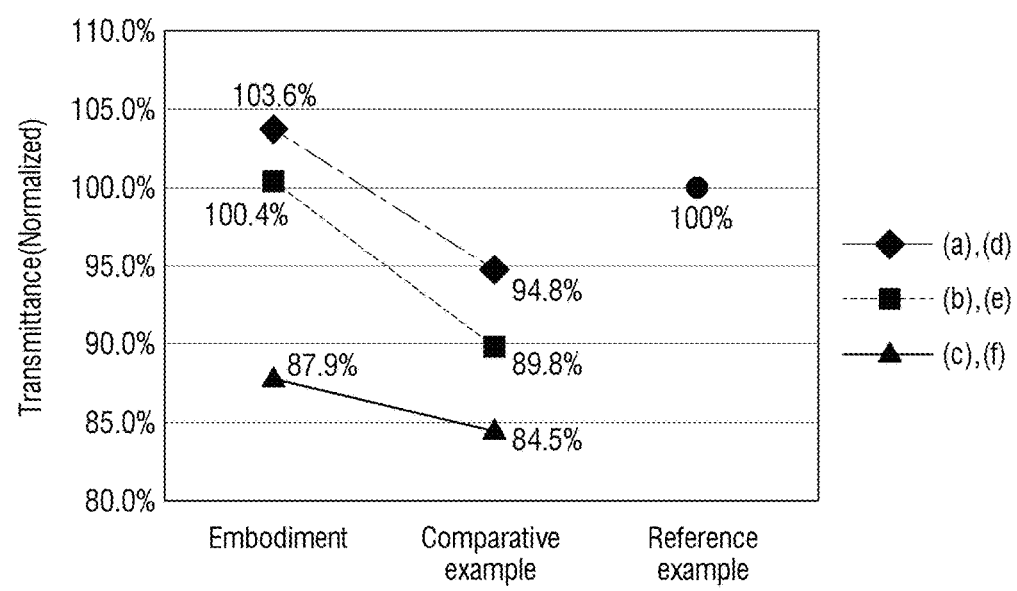
FIG. 12 is a graph showing examples and comparative Examples of the transmittance of pixels according to the invention.

FIGS. 8 and 9 are photographs showing the transmittance of pixels according to Examples of the invention, FIGS. 10 and 11 are photographs showing the transmittance of pixels according to Examples and Comparative Examples of the invention, and FIG. 12 is a graph showing the transmittance of pixels according to Examples and Comparative Examples of the invention.

Referring to FIGS. 8 to 11, when the protrusion unit 198 is disposed at the edge region of the pixel PX, the liquid crystal molecules 302 has a pretilt angle in the direction from the edge of the pixel PX to the inside of the pixel PX, so that it is possible to minimize the horizontal electric field component that irregularly arranges the liquid crystal molecules 302 and to allow the liquid crystal molecules 302 to have the average liquid crystal azimuth 310. That is, the liquid crystal molecules 302 having the average liquid crystal azimuth 310 may be arranged by controlling the sum of a vector caused by an electric field determining the azimuth of the liquid crystal molecules 302 and a vector caused by the collision of the liquid crystal molecules 302, that is, by controlling the components of the two vectors.

Therefore, when the protrusion unit 198 is disposed at the edge region of the pixel PX, a vector capable of secondarily arranging the liquid crystal molecules 302 adjacent to the edge of the pixel electrode 191 is provided, and thus it is possible to prevent the liquid crystal molecules 302 adjacent to the edge of the pixel electrode 191 from being inclined in a direction similar to the polarization axis. That is, it is possible to prevent the deterioration of display quality occurring when the liquid crystal molecules 302 are arranged in a direction parallel to the polarization axis in the edge region of the pixel electrode 191, that is, the second and third regions X and Y.

First, FIG. 8 shows photographs of planes of a pixel according to an exemplary embodiment of the invention when the response speed is about 30 milliseconds (ms), and FIG. 9 shows photographs of planes of a pixel according to an exemplary embodiment of the invention when the response speed is about 300 ms.

In FIGS. 8 and 9, (a) is a photograph showing the plane of a pixel when the external bundling electrode unit 193 and the protrusion unit 198 overlap each other by about 0.5 μm, (b) is a photograph showing the plane of a pixel when the external bundling electrode unit 193 and the protrusion unit 198 overlap each other by about 1.5 μm, and (c) is a photograph showing the plane of a pixel when the external bundling electrode unit 193 and the protrusion unit 198 overlap each other by about 2.5 μm.

FIGS. 10 and 11 show photographs imaged under the same conditions as in FIGS. 8 and 9, but Comparative Examples are photographs of a pixel having the protrusion unit 198 and the branch unit 194. That is, Comparative Examples are photographs of a pixel in which the external bundling electrode unit 193 is not disposed between the branch unit 194 and the protrusion 198. In FIGS. 10 and 11, (d) is a photograph showing the plane of a pixel when the external bundling electrode unit 193 and the end of the branch unit 194 overlap each other by about 0.5 μm, (e) is a photograph showing the plane of a pixel when the external bundling electrode unit 193 and the end of the branch unit 194 overlap each other by about 1.5 μm, and (f) is a photograph showing the plane of a pixel when the external bundling electrode unit 193 and the end of the branch unit 194 overlap each other by about 2.5 μm.

Here, based on Reference Example in which the external bundling electrode unit 193 and the protrusion unit 198 are not disposed and only the stem unit 192 and the branch unit 194 are disposed in the pixel electrode 191 and in which transmittance is about 100 percent (%), Examples and Comparative Examples are compared.

Referring to FIG. 12, (a) when the external bundling electrode unit 193 and the protrusion unit 198 overlap each other by about 0.5 μm, the transmittance is about 103.6%, and (d) when the external bundling electrode unit 193 and the end of the branch unit 194 overlap each other by about 0.5 μm, the transmittance is about 94.8%.

As such, when the overlapping area of the protrusion unit 198 and the external bundling electrode unit 193 is small, it is determined that the exposed area of the external bundling electrode unit 193 increases, so as to increase the transmittance by about 3.6%. Thus, when the protrusion unit 198 and the external bundling electrode unit 193 are disposed in one pixel PX, it is possible to increase the number of the liquid crystal molecules 302 behaving in the edge region of the pixel PX. That is, it is determined that the transmittance in the edge region of the pixel PX is improved by increasing the number of the liquid crystal molecules 302 having the average liquid crystal azimuth in the edge region of the pixel PX.

In the case of (d) of FIG. 12, it is seen that the transmittance is further deteriorated by about 5.2% compared to Reference Example. The reason for this is determined that the liquid crystal molecules 302 behaving in a region corresponding to the region of the external bundling electrode unit 193 do not exist, and the physical pretilting is provided by the protrusion unit 198, so that the number of the liquid crystal molecules 302 behaving in a direction of about 0° or about 90° increases, so as to deteriorate the transmittance. Here, the liquid crystal molecules 302 behaving in a direction of about 0° or about 90° become a factor of causing the deterioration of transmittance because this angle is a similar angle to the polarization axis. Moreover, since the external bundling electrode unit is not disposed at the edge of the pixel PX, a horizontal electric field component may not be generated in the edge region of the pixel PX.

Further, referring to FIG. 12, (b) when the external bundling electrode unit 193 and the protrusion unit 198 overlap each other by about 1.5 μm, the transmittance is about 100.4%, and (e) when the external bundling electrode unit 193 and the end of the branch unit 194 overlap each other by about 1.5 μm, the transmittance is about 89.8%.

As such, when the overlapping area of the protrusion unit 198 and the external bundling electrode unit 193 is larger than that in the case of (a), it is determined that the exposed area of the external bundling electrode unit 183 increases, so as to increase the transmittance by about 0.4%.

In the case of (e) of FIG. 12, it is seen that the transmittance is further deteriorated by about 10.2% compared to Reference Example. The reason for this is determined that the liquid crystal molecules 302 behaving in a region corresponding to the region of the external bundling electrode unit 193 do not exist, and the physical pretilting is provided by the protrusion unit 198, so that the number of the liquid crystal molecules 302 behaving in a direction of about 0° or about 90° increases and the overlapping area of the protrusion unit 198 and the branch unit 194 increases, so as to further deteriorate the transmittance.

Further, referring to FIG. 12, (c) when the external bundling electrode unit 193 and the protrusion unit 198 overlap each other by about 2.5 μm, the transmittance is about 87.9%, and (f) when the external bundling electrode unit 193 and the end of the branch unit 194 overlap each other by about 2.5 μm, the transmittance is about 84.5%.

As such, when the overlapping area of the protrusion unit 198 and the external bundling electrode unit 193 is larger than that in the case of (b), it is determined that the exposed area of the external bundling electrode unit 183 increases, so as to increase the transmittance by about 12.1%.

In the case of (f) of FIG. 12, it is seen that the transmittance is further deteriorated by about 15.2% compared to Reference Example. The reason for this is determined that the liquid crystal molecules 302 behaving in a region corresponding to the region of the external bundling electrode unit 193 do not exist, and the physical pretilting is provided by the protrusion unit 198, so that the number of the liquid crystal molecules 302 behaving in a direction of about 0° or about 90° increases and the overlapping area of the protrusion unit 198 and the branch unit 194 increases, so as to further deteriorate the transmittance.

In conclusion, as shown in Example (a) of FIG. 12, it is seen that the transmittance is increased by allowing the external bundling electrode unit 193 and the second and third slit patterns 195b and 195c to control the behavior of the liquid crystal molecules 302 disposed in the edge region of the pixel PX.

As described above, when the external bundling electrode unit 193 and the protrusion unit are disposed at the edge of one pixel PX, the possibility of forming the liquid crystal molecules 302 having the average liquid crystal azimuth 310 increases, thereby improving the transmittance of the LCD. Further, in the LCD according to an exemplary embodiment of the invention, the transmittance thereof may be improved by increasing the exposed area of the pixel electrode 191 in the region in which the transmittance is deteriorated, and the response speed thereof may be improved by arranging the second and third slit patterns 195*b* and 195*c* to decrease the entire area of the pixel electrode 191.

Figure 13:
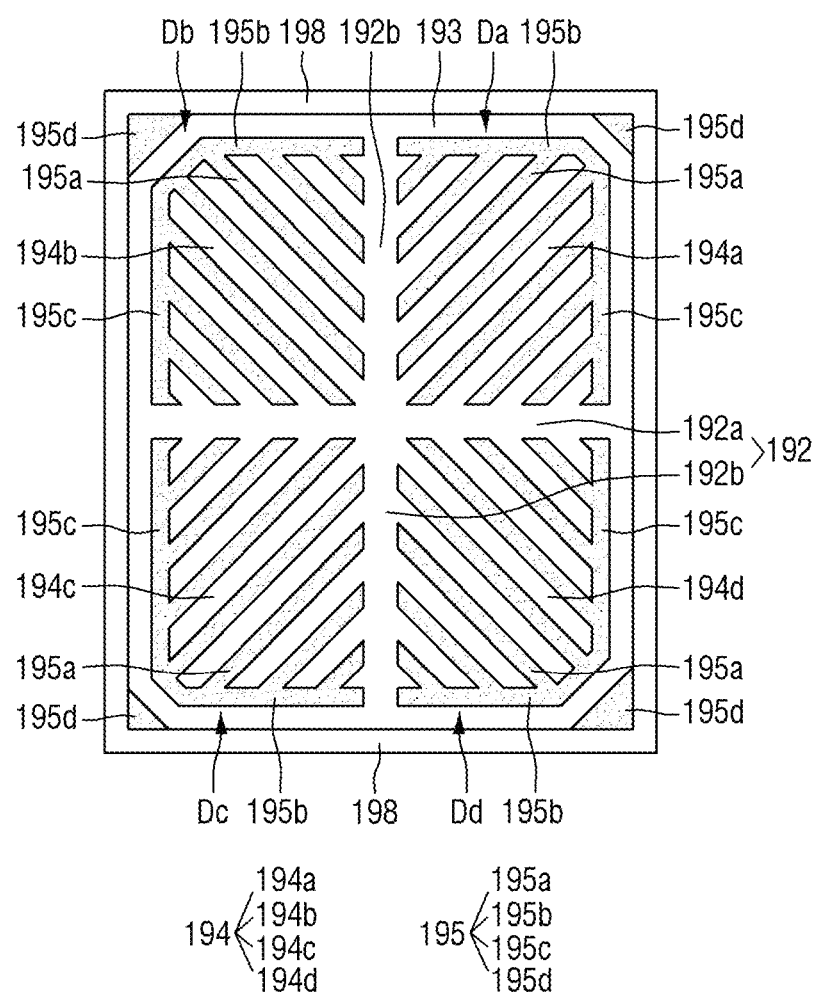
FIG. 13 is a plan view showing another exemplary embodiment of a pixel of the LCD according to the invention.
Figure 14:
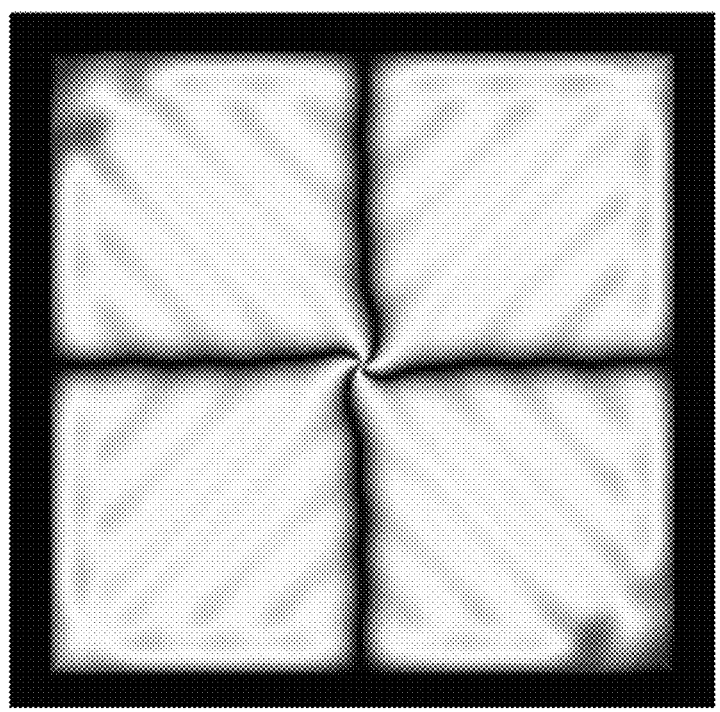
FIG. 14 is a photograph showing the plane of the pixel of FIG. 13.

FIG. 13 is a plan view showing a pixel of the LCD according to still another exemplary embodiment of the invention, FIG. 14 is a photograph showing the plane of the pixel of FIG. 13, and FIGS. 15 to 17 are plan views showing pixels of the LCD according to still another exemplary embodiment of the invention.

First, briefly explaining the LCD of the invention, first, one pixel PX may be provided with the protrusion unit 198 and the pixel electrode 191 (refer to FIG. 1), and the protrusion unit 198 may be disposed to surround the edge of the pixel electrode 191. Further, the pixel electrode 191 is configured such that the external bundling electrode unit 193 which contacts the protrusion unit 198 and is disposed in parallel to the protrusion unit 198, the horizontal and vertical stems 192*a* and 192*b* which are connected to the external bundling electrode unit 193 and divide the pixel PX into a plurality of domains, and the branch unit 194 extending to the horizontal stem 192*a* and the vertical stem 192*b* to be connected with the external bundling electrode unit 193 are integrally provided.

The branch unit 194 is provided with a plurality of branch electrodes 194*a*, 194*b*, 194*c*, and 194*d*, and the branch electrodes 194*a*, 194*b*, 194*c*, and 194*d* may be spaced apart from each other by the first slit pattern 195*a*.

The first slit pattern 195*a* may be defined by removing the adjacent electrodes 194*a*, 194*b*, 194*c*, and 194*d* to expose an insulating layer including a protective layer disposed under the pixel electrode 191.

The second slit pattern 195*b* is disposed between the right and left regions of the external bundling electrode unit 193 and the ends of the branch electrodes 194*a*, 194*b*, 194*c*, and 194*d* to space the external bundling electrode unit 193 apart from the ends of the branch electrodes 194*a*, 194*b*, 194*c*, and 194*d*. In other words, the second slit pattern 195*b* may be disposed along the upper or lower ends of the branch electrodes 194*a*, 194*b*, 194*c*, and 194*d*.

The third slit pattern 195*c* is disposed between the upper and lower regions of the external bundling electrode unit 193 and the ends of the branch electrodes 194*a*, 194*b*, 194*c*, and 194*d* to space the external bundling electrode unit 193 apart from the ends of the branch electrodes 194*a*, 194*b*, 194*c*, and 194*d*. In other words, the third slit pattern 195*c* may be disposed along the right or left ends of the branch electrodes 194*a*, 194*b*, 194*c*, and 194*d*.

In the exemplary embodiment, the fourth slit 195*d* may further be disposed at each of the corners of the pixel PX. The fourth slit 195*d* may be disposed at each of the corners thereof to have a symmetric or asymmetric area.

In the exemplary embodiment, the fourth slit pattern 195*d* may be disposed such that the area of right upper corner region of the pixel PX is the same as that of left lower corner region of the pixel PX, and the area of left upper corner region of the pixel PX is the same as that of right lower corner region of the pixel PX.

As such, the fourth slit 195*d* is further disposed at each of the corners of the pixel PX to minimize the irregular arrangement of the liquid crystal molecules 302 occurring at the corner region of the pixel PX, so as to prevent the deterioration of transmittance at the corner region thereof.

Figure 15:
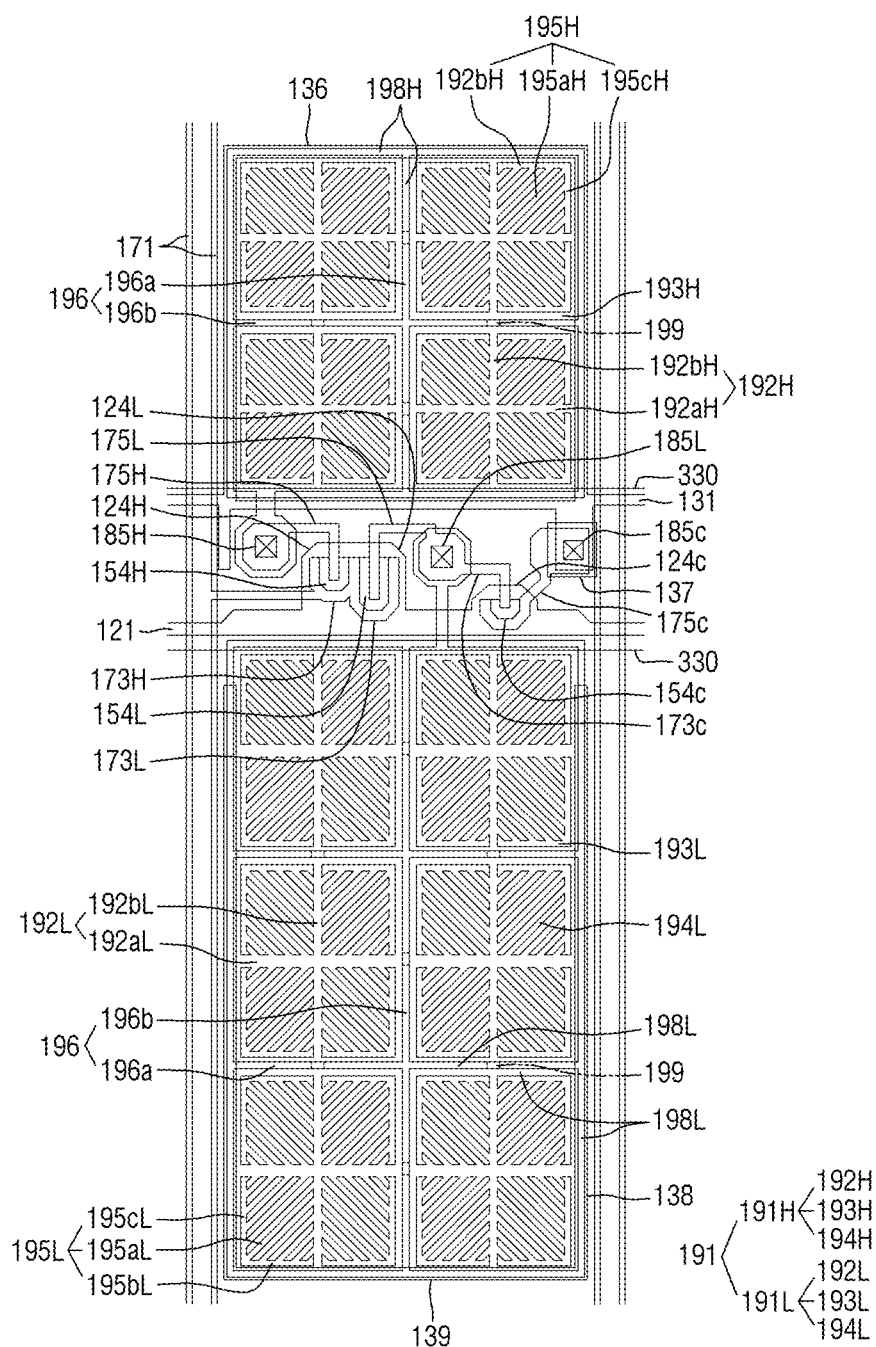
FIGS. 15 to 17 are plan views showing another exemplary embodiment of pixels of the LCD according to the invention.

Referring to FIG. 15, first and second sub-pixel electrodes 191H and 191L may be disposed in first and second sub-pixel regions PXH and PXL, respectively. Hereinafter, for the convenience of explanation, the first and second sub-pixel regions PXH and PXL are expressed by a sub-pixel PX unit region, and the first and second sub-pixel electrodes 191H and 191L are expressed by a sub-pixel electrode unit 191.

A plurality of sub-pixel electrode units 191 is disposed in the sub-pixel PX unit region, and the sub-pixel electrode units 191 may be spaced apart from each other with an intermediate unit 196 disposed therebetween. A connecting electrode 199 is provided in the intermediate unit 196 to connect the adjacent sub-pixel electrode units to each other, thereby receiving the same voltage. The intermediate unit 196 may include a horizontal intermediate portion 196*a* provided in the horizontal direction of the sub-pixel PX unit region and a vertical intermediate portion 196*b* provided in the vertical direction of the sub-pixel PX unit region. Further, a peripheral intermediate unit for adjusting the interval between the gate line 121 and the data line 171 disposed along the edge of the sub-pixel PX unit region may be provided.

A protrusion unit 198 may be disposed in the intermediate unit 196 for spacing the sub-pixel electrode units 191. That is, the protrusion unit 198 may be disposed on the horizontal and vertical intermediate portions 196*a* and 196*b*, and may also be disposed on the peripheral intermediate unit disposed along the edge of the sub-pixel PX unit region. The connecting electrode 199 for connecting the sub-pixel electrode units 191 to each other through the protrusion unit 198 disposed on the horizontal and vertical intermediate portions 196*a* and 196*b* may be disposed under the protrusion unit 198.

As such, when the protrusion unit 198 is disposed at the edge of the sub-pixel PX unit region, an electric field proceeding into the sub-pixel PX unit region may be provided. Further, when the external bundling electrode unit 193 and the second and third slit patterns 195*b* and 195*c* are disposed in the sub-pixel PX unit region adjacent to the protrusion unit 198, a vector capable of secondarily arranging the liquid crystal molecules 302 disposed in the sub-pixel PX unit region adjacent to the protrusion unit 198 may be provided.

Therefore, the irregularly arranged liquid crystal molecules 302 may be arranged in the direction of the average liquid crystal azimuth by behaving the liquid crystal molecules 302 at the edge of the sub-pixel PX unit region. Accordingly, the transmittance at the edge of the sub-pixel PX unit region is improved, and thus the transmittance of the entire pixel PX may be improved.

Figure 16:
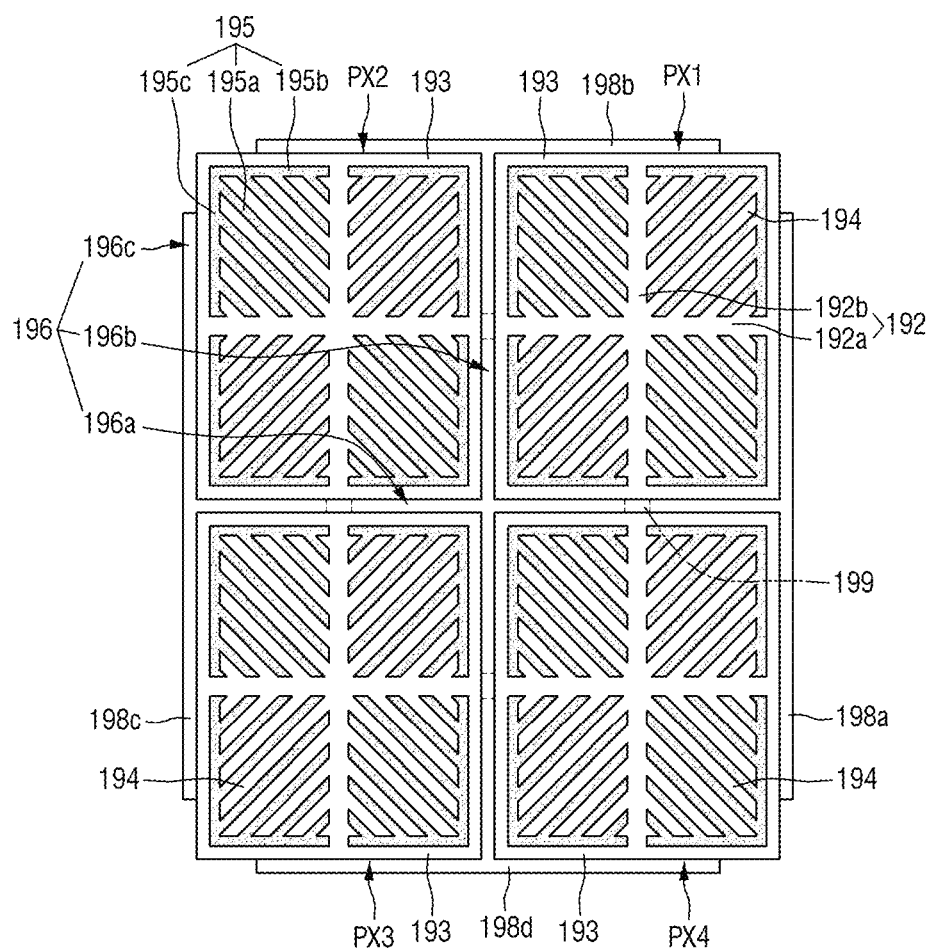

Referring to FIG. 16, based on each of sub-pixel electrode units 191, the protrusion unit 198 may be disposed at a part of the edge of each of the sub-pixel electrode unit 191.

Therefore, the protrusion units 198 may be disposed in the edge region of the sub-pixel PX unit region one by one. That is, other protrusions 198*a*, 198*b*, 198*c*, and 198*d*, which are spaced apart from the protrusion unit 198, may be disposed in a region in which the peripheral intermediate unit is provided. Further, the protrusion unit 198 may be arranged to be connected to each other in the horizontal and vertical intermediate portions 196*a* and 196*b*.

For the convenience of explanation, the protrusion unit 198 disposed at the right side of the sub-pixel electrode unit 191 is defined as a first protrusion unit 198*a*, the protrusion unit 198 disposed at the upper side of the sub-pixel electrode unit 191 is defined as a second protrusion unit 198*b*, the protrusion unit 198 disposed at the left side of the sub-pixel electrode unit 191 is defined as a third protrusion unit 198c, and the protrusion unit 198 disposed at the lower side of the sub-pixel electrode unit 191 is defined as a fourth protrusion unit 198d.

Further, among the sub-pixel electrode units 191 disposed in the sub-pixel PX unit region, the sub-pixel electrode unit 191 disposed at right upper side of the sub-pixel PX unit region is defined as a first sub-pixel electrode unit PX1, the sub-pixel electrode unit 191 disposed at left upper side of the sub-pixel PX unit region is defined as a second sub-pixel electrode unit PX2, the sub-pixel electrode unit 191 disposed at left lower side of the sub-pixel PX unit region is defined as a third sub-pixel electrode unit PX3, and the sub-pixel electrode unit 191 disposed at right lower side of the sub-pixel PX unit region is defined as a fourth sub-pixel electrode unit PX4.

The protrusion units 198 disposed at the horizontal and vertical intermediate portions 196a and 196b in each sub-pixel PX unit region may be arranged to be shared with each other.

The protrusion unit 198 disposed at the edge of the sub-pixel PX unit region may be connected with at least one of the protrusion units 198 disposed at the horizontal and vertical intermediate portions 196a and 196b.

Specifically, the first protrusion unit 198a may be disposed at the right side of the first sub-pixel electrode unit PX1 and the right side of the fourth sub-pixel electrode unit PX4. Here, a region in which the first protrusion unit 198a is removed may exist in the right upper corner region of the first sub-pixel electrode unit PX1 and the right lower corner region of the fourth sub-pixel electrode unit PX4. The first protrusion unit 198a may be connected to the right end of the protrusion unit 198 disposed at the horizontal intermediate portion 196a.

The second protrusion unit 198b may be disposed at the upper side of the first sub-pixel electrode unit PX1 and the upper side of the second sub-pixel electrode unit PX2. Here, a region in which the second protrusion unit 198b is removed may exist in the right upper corner region of the first sub-pixel electrode unit PX1 and the left upper corner region of the second sub-pixel electrode unit PX2. The second protrusion unit 198b may be connected to the upper end of the protrusion unit 198 disposed at the vertical intermediate portion 196b.

The third protrusion unit 198c may be disposed at the left side of the second sub-pixel electrode unit PX2 and the left side of the third sub-pixel electrode unit PX3. Here, a region in which the third protrusion unit 198c is removed may exist in the left upper corner region of the second sub-pixel electrode unit PX2 and the left lower corner region of the third sub-pixel electrode unit PX3. The third protrusion unit 198c may be connected to the left end of the protrusion unit 198 disposed at the horizontal intermediate portion 196a.

The fourth protrusion unit 198d may be disposed at the lower side of the third sub-pixel electrode unit PX3 and the lower side of the fourth sub-pixel electrode unit PX4. Here, a region in which the fourth protrusion unit 198d is removed may exist in the left lower corner region of the third sub-pixel electrode unit PX3 and the right lower corner region of the fourth sub-pixel electrode unit PX4. The fourth protrusion unit 198d may be connected to the lower end of the protrusion unit 198 disposed at the vertical intermediate portion 196b.

The first to fourth protrusion units 198a to 198d may be disposed to cover the horizontal stem 192a or the horizontal stem 192b, which is disposed on each of the sub-pixels.

As such, when the protrusion unit 198 is removed from the corner region of the sub-pixel PX unit region, the number of the liquid crystal molecules 302, which are irregularly arranged in the corner region of the sub-pixel PX unit region by the collision of the liquid crystal molecules 302, may be minimized. Therefore, it is possible to prevent the deterioration of the transmittance occurring in the corner region of the sub-pixel PX unit region.

Figure 17:
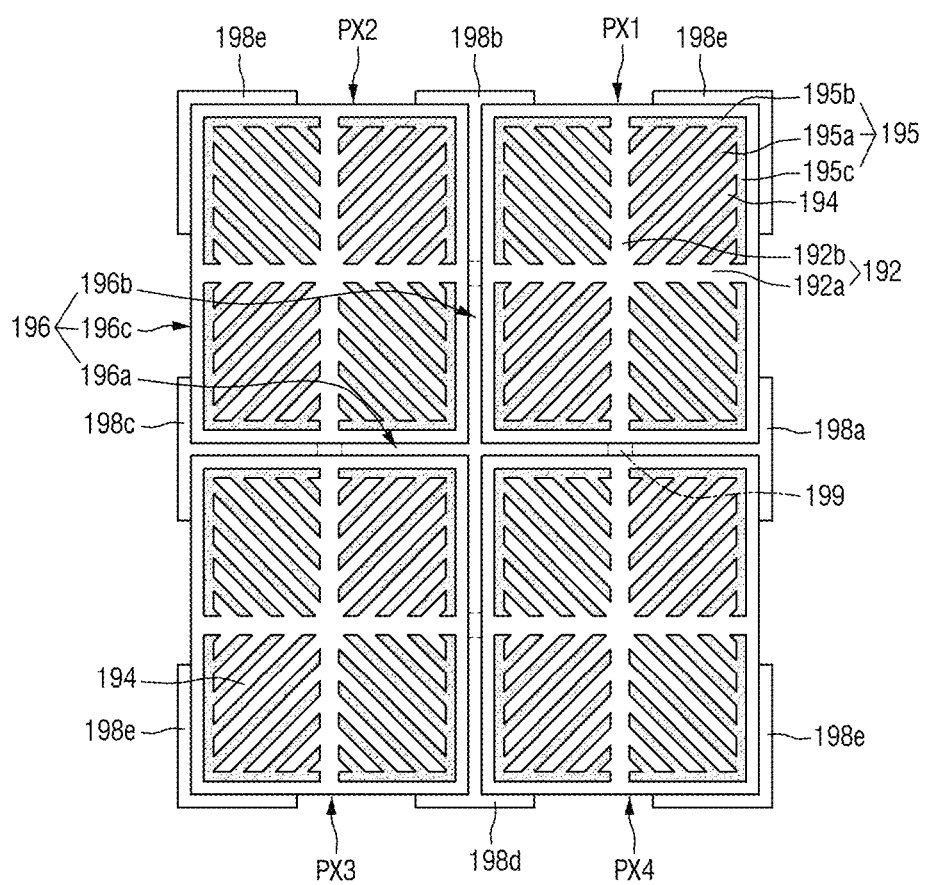

As shown in FIG. 17, the fifth protrusion unit 198e may be disposed at each corner region of the sub-pixel PX unit region, and the first to fourth protrusion units 198a, 198b, 198c, and 198d may be disposed in the region adjacent to the end of each of the horizontal and vertical intermediate portions 196a and 196b. The first to fifth protrusion units 198a, 198b, 198c, 198d, and 198e may be disposed to be spaced apart from each other.

It may be difficult to arrange the liquid crystal molecules 302 defined by the average liquid crystal azimuth 310 at the ends of the horizontal and vertical intermediate portions 196a and 196b. In the first domain Da, for example, the liquid crystal molecules 302 are behaved in the direction of the first horizontal electric field F1 and the second horizontal electric field F2, and the behaved liquid crystal molecules 302 secondarily collides with each other, thereby arranging the liquid crystal molecules 302 at the average liquid crystal azimuth 310. However, the force of any one of the first horizontal electric field F1 and the second horizontal electric field F2 is more greatly applied to the region adjacent to the end of each of the horizontal and vertical intermediate portions 196a and 196b, and thus it is difficult to arrange the liquid crystal molecules 302 in the direction of the average liquid crystal azimuth 310.

When such forces of electric fields are different from each other, first to fourth protrusion units 198a, 198b, 198c, and 198d may be generated in the region in which the liquid crystal molecules 302 are irregularly arranged. The region in which the first to fourth protrusion units 198a, 198b, 198c, and 198d are not arranged may be a region in which force of an electric field is stably provided.

Therefore, in the region in which the first to fourth protrusion units 198a, 198b, 198c, and 198d are not arranged, the liquid crystal molecules 302 may be stably arranged even when the first to fourth protrusion units 198a, 198b, 198c, and 198d are not provided. Further, a fifth protrusion unit 198e may be disposed even in the corner region of the pixel PX, in which the liquid crystal molecules 302 are irregularly arranged by collision.

Further, the first to fourth protrusion units 198a, 198b, 198c, and 198d may be disposed not to cover the horizontal stem 192a or the vertical stem 192b disposed in each of the sub-pixel unit.

Therefore, when the first to fourth protrusion units 198a, 198b, 198c, and 198d are disposed at the ends of the horizontal and vertical intermediate portions 196a and 196b and the fifth protrusion unit 198e is disposed in the corner region of the pixel PX, the number of the liquid crystal molecules 302 behaving in the direction of the average liquid crystal azimuth 310 increases, thereby improving the transmittance of the LCD.

As such, when a vector capable of secondarily arranging the liquid crystal molecules 302 adjacent to the edge of the pixel electrode 191 is provided, it is possible to prevent the liquid crystal molecules 302 adjacent to the edge of the pixel electrode 191 from being inclined in a direction perpendicular to the edge of the pixel electrode 191. That is, it is possible to prevent the deterioration of display quality occurring when the liquid crystal molecules 302 are arranged in a direction parallel to the polarization axis at the edge of the pixel electrode 191.

As described above, according to the embodiments of the invention, there is an advantage in that the response speed and transmittance of the LCD may be improved by changing the shape of an electrode and forming the slit pattern and protrusion spacing electrodes in a pixel.

Although certain exemplary embodiments and implementations have been described herein, other exemplary embodiments and modifications will be apparent from this description. Accordingly, the invention is not limited to such exemplary embodiments, but rather to the broader scope of the presented claims and various obvious modifications and equivalent arrangements.

What is claimed is:

1. A liquid crystal display comprising:
   a first panel comprising a first substrate;
   a first electrode which is disposed on the first substrate and which includes a stem unit including a horizontal stem and a vertical stem dividing a pixel into a plurality of domains, a branch unit including a plurality of branch electrodes and extending from at least one stem of the stem unit in one direction, and an external bundling electrode unit connected to at least one stem of the stem unit and disposed along an edge of the pixel;
   a first slit pattern which is defined in the branch unit and spaces the plurality of branch electrodes apart from each other;
   a second slit pattern which contacts the vertical stem and is disposed in a direction parallel to the horizontal stem;
   a third slit pattern which contacts the horizontal stem and is disposed in a direction parallel to the vertical stem; and a protrusion unit which is disposed on an outer circumference of the external bundling electrode unit and protrudes in a direction perpendicular to the first substrate;
   a second panel, comprising a second substrate, and a second electrode disposed on the second substrate and facing the first electrode; and
   a liquid crystal layer disposed between the first panel and the second panel.

2. The liquid crystal display according to claim 1, wherein the second slit pattern is connected to an end of a lateral side of the first slit pattern, and the third slit pattern is connected to ends of upper and lower sides of the first slit pattern.

3. The liquid crystal display according to claim 1, wherein the second and third slit patterns space the external bundling electrode unit apart from the ends of the plurality of branch electrodes.

4. The liquid crystal display according to claim 1, wherein the plurality of branch electrodes and the first, second and third slit patterns, which are disposed in a domain and another domain adjacent to the domain, are alternately arranged.

5. The liquid crystal display according to claim 1, wherein pitches of the plurality of branch electrodes and the first slit pattern are in a range of about 4 micrometers to about 8 micrometers.

6. The liquid crystal display according to claim 1, further comprising:
   a first polarizing plate having a polarization axis aligned on the first panel in one direction; and
   a second polarizing plate having a polarization axis aligned on the second panel in a direction perpendicular to the one direction,
   wherein an extending direction of the branch unit is in a range of about 30 degrees to about 60 degrees with respect to the polarization axis of each of the first and second polarizing plates.

7. The liquid crystal display according to claim 1, wherein the first electrode is configured such that the external bundling electrode unit which contacts the protrusion unit and is disposed in a direction parallel to the protrusion unit, the stem unit which is connected to the external bundling electrode unit and includes the horizontal and vertical stems dividing the pixel into the plurality of domains, and the branch unit which extends to the horizontal and vertical stems and connected to the external bundling electrode unit are integrally provided.

8. The liquid crystal display according to claim 7, wherein widths of the horizontal and vertical stems are in a range of about 2 micrometers to about 5 micrometers.

9. The liquid crystal display according to claim 1, wherein a height of the protrusion unit is in a range of about 0.5 micrometer to about 2 micrometers.

10. The liquid crystal display according to claim 1, wherein a width of the external bundling electrode unit is in a range of about 2 micrometers to about 4 micrometers.

11. The liquid crystal display according to claim 1, wherein widths of the second and third slit patterns and the external bundling electrode unit are in a range of about 4 micrometers to 8 micrometers.

12. The liquid crystal display according to claim 1, wherein widths of the protrusion unit and the external bundling electrode unit are in a range of about 7 micrometers to about 9 micrometers.

13. The liquid crystal display according to claim 1, wherein a width of the protrusion unit is in a range of about 3 micrometers to about 5 micrometers.

14. The liquid crystal display according to claim 1, wherein the first electrode disposed in the pixel further includes:
   a first region in which the branch unit is disposed adjacent to the stem unit; and
   a second region in which one or more of external bundling electrodes of the external bundling electrode unit and protrusions of the protrusion unit, which are connected to the end of one of the branch electrodes, are spaced apart from the stem unit,
   wherein the external bundling electrode unit and the protrusion unit disposed in the second region provide a vector for rotating the liquid crystal molecules in the second region in a direction similar to an average liquid crystal azimuth of the liquid crystal molecules in the first region.

15. The liquid crystal display according to claim 14, wherein an extending direction of the plurality of branch electrodes is identical with the average liquid crystal azimuth of the liquid crystal molecules.

16. The liquid crystal display according to claim 1, wherein
   the first electrode further comprises:
   a plurality of sub-electrodes disposed in one pixel; and
   a connection electrode connecting the plurality of sub-electrodes adjacent to each other.

17. The liquid crystal display according to claim 16, wherein the connection electrodes is disposed in an intermediate unit spacing the adjacent sub-electrodes of the plurality of sub-electrodes apart from each other.

18. The liquid crystal display according to claim 17, wherein the protrusion unit is disposed in the intermediate unit.

19. The liquid crystal display according to claim 1, wherein protrusions of the protrusion unit are disposed at ends of the horizontal and vertical stems and corners of the pixel.

20. The liquid crystal display according to claim 1, wherein the protrusion unit is disposed at the edge of the pixel excluding a corner of the pixel.

* * * * *